(12) United States Patent
Yamagiwa et al.

(10) Patent No.: US 7,738,752 B2
(45) Date of Patent: Jun. 15, 2010

(54) OPTICAL WAVEGUIDE SYSTEM

(75) Inventors: Masakazu Yamagiwa, Tokyo (JP); Kenji Todori, Yokohama (JP); Reiko Yoshimura, Kawasaki (JP); Miho Maruyama, Yokohama (JP); Kou Yamada, Yokohama (JP); Yasuyuki Hotta, Tokyo (JP); Tsukasa Tada, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/496,616

(22) Filed: Jul. 1, 2009

(65) Prior Publication Data
US 2010/0021104 A1      Jan. 28, 2010

(30) Foreign Application Priority Data
Jul. 23, 2008      (JP) ............................ 2008-189876

(51) Int. Cl.
```
G02B 6/42      (2006.01)
G02B 6/12      (2006.01)
G02B 6/00      (2006.01)
G02B 6/032     (2006.01)
G02B 6/10      (2006.01)
H01S 5/00      (2006.01)
H01S 3/22      (2006.01)
H01S 3/03      (2006.01)
H01S 3/091     (2006.01)
H01S 3/08      (2006.01)
```
(52) U.S. Cl. .............................. 385/39; 385/14; 385/27; 385/31; 385/122; 385/125; 385/129; 385/130; 385/131; 385/132; 385/141; 372/43.01; 372/44.011; 372/45.01; 372/46.01; 372/49.01; 372/50.1; 372/50.11; 372/50.124; 372/56; 372/64; 372/76; 372/102

(58) Field of Classification Search .................. 385/14, 385/27, 31, 39, 122, 125, 129–132, 141; 372/43.01, 44.011, 45.01, 46.01, 49.01, 50.1, 372/50.11, 50.124, 56, 64, 76, 102
See application file for complete search history.

(56) References Cited

U.S. PATENT DOCUMENTS
7,372,067 B2      5/2008    Todori et al.
(Continued)

FOREIGN PATENT DOCUMENTS
JP      2002-311267      10/2002
(Continued)

OTHER PUBLICATIONS
Maruyama et al., "Process for Producing Metallic-Nanoparticle Inorganic Composite and Metallic-Nanoparticle Inorganic Composite", U.S. Appl. No. 12/237,743, filed Sep. 25, 2008.
(Continued)

*Primary Examiner*—Brian M. Healy
*Assistant Examiner*—Hung Lam
(74) *Attorney, Agent, or Firm*—Finnegan, Henderson, Farabow, Garrett & Dunner, L.L.P.

(57) ABSTRACT

It is made possible to provide an optical waveguide system that has a coupling mechanism capable of selecting a wavelength and has the highest possible conversion efficiency, and that is capable of providing directivity in the light propagation direction. An optical waveguide system includes: a three-dimensional photonic crystalline structure including crystal pillars and having a hollow structure inside thereof; an optical waveguide in which a plurality of metal nanoparticles are dispersed in a dielectric material, the optical waveguide having an end portion inserted between the crystal pillars of the three-dimensional photonic crystalline structure, and containing semiconductor quantum dots that are located adjacent to the metal nanoparticles and emit near-field light when receiving excitation light, the metal nanoparticles exciting surface plasmon when receiving the near-field light; and an excitation light source that emits the excitation light for exciting the semiconductor quantum dots.

6 Claims, 6 Drawing Sheets

U.S. PATENT DOCUMENTS

| | | |
|---|---|---|
| 7,471,863 B2 | 12/2008 | Todori et al. |
| 2006/0067602 A1 | 3/2006 | Todori et al. |
| 2006/0163556 A1 | 7/2006 | Yoshimura et al. |
| 2006/0169971 A1 | 8/2006 | Cho et al. |
| 2006/0279833 A1 | 12/2006 | Yoshimura et al. |
| 2008/0240652 A1* | 10/2008 | Todori et al. .................. 385/27 |
| 2008/0241473 A1 | 10/2008 | Maruyama et al. |

FOREIGN PATENT DOCUMENTS

| | | |
|---|---|---|
| JP | 2006-163188 | 6/2006 |
| JP | 2006-171479 | 6/2006 |
| JP | 2006-216560 | 8/2006 |
| JP | 2007-148289 | 6/2007 |

OTHER PUBLICATIONS

Saiki et al., "Tailoring a High-Transmission Fiber Probe for Photon Scanning Tunneling Microscope", Appl. Phys. Lett., vol. 68, No. 19, pp. 2612-2614, (1996).

Ishi et al., "Si Nano-Photodiode With a Surface Plasmon Antenna", Japanese Journal of Applied Physics, vol. 44, No. 12, pp. L 364-L 366, (2005).

Nomura et al., "Nanodot Coupler With a Surface Plasmon Polariton Condenser for Optical Far/Near-Field Conversion", Applied Physics Letters, vol. 86, pp. 181108-1-181108-3, (2005).

Raether, "Surface Plasmons on Smooth and Rough Surfaces and on Gratings", Springer-Verlag, Berlin, Germany, pp. 10-13, (1998).

Parekh, "Metal Nanoparticle and Quantum Dot Metamaterials for Near Resonant Surface Plasmon Waveguides", Nano-Optoelectronics Workshop, I-Now '07, International, pp. 150-151, (2007).

Noda et al., "Alignment and Stacking of Semiconductor Photonic Bandgaps by Wafer-Fusion", Journal of Lightwave Technology, vol. 17, No. 11, pp. 1948-1955, (1999).

Murray et al., "Synthesis and Characterization of Nearly Monodisperse CdE (E = S, Se, Te) Semiconductor Nanocrystallites", Journal of American Chemical Society, vol. 115, pp. 8706-8715, (1993).

Mahamuni et al., "Thiophenol-Capped ZnS Quantum Dots", Journal of Applied Physics, vol. 73, pp. 5237-5240, (1993).

Fisher et al., "Emission Intensity Dependence and Single-Exponential Behavior in Single Colloidal Quantum Dot Fluorescence Lifetimes", Journal of Physical Chemistry, B, vol. 108, pp. 143-148, (2004).

Dabbousi et al., "(CdSe)ZnS Core-Shell Quantum Dots: Synthesis and Characterization of a Size Series of Highly Luminescent Nanocrystallites", Journal of Physical Chemistry, B, vol. 101, pp. 9463-9475, (1997).

Brus, "Quantum Crystallites and Nonlinear Optics", Applied Physics A, vol. 53, pp. 465-474, (1991).

Leppert et al., "Structural and Optical Characteristics of ZnSe Nanocrystals Synthesized in the Presence of a Polymer Capping Agent", Materials Science and Engineering B52, pp. 89-92, (1998).

Heath et al., "Germanium quantum dots: Optical properties and synthesis," J. Chem. Phys. (Jul. 15, 1994), 101:1607-15.

* cited by examiner

| MATERIAL | MINIMUM RADIUS [nm] | MAXIMUM RADIUS [nm] | SHORTEST EMISSION WAVELENGTH [nm] | LONGEST EMISSION WAVELENGTH [nm] |
|---|---|---|---|---|
| Si | 1 | 7 | 557 | 1085 |
| Ge | 1 | 8 | 556 | 1811 |
| GaAs | 2 | 14 | 412 | 854 |
| AlAs | 2 | 11 | 418 | 570 |
| InAs | 3 | 9 | 528 | 2167 |
| GaP | 1 | 6 | 426 | 542 |
| InP | 2 | 13 | 456 | 903 |
| GaSb | 3 | 16 | 638 | 1566 |
| AlSb | 1 | 8 | 422 | 756 |
| InSb | 4 | 23 | 647 | 5332 |
| CdSe | 2 | 11 | 464 | 700 |
| CdS | 3 | 9 | 436 | 475 |
| $Al_xGa_{1-x}As$ | 2 | 14 | 412 | 854 |
| $GaAs_{1-x}Sb_x$ | 2 | 16 | 412 | 1566 |
| $In_{1-x}Ga_xP$ | 1 | 13 | 426 | 903 |
| $In_{1-x}Ga_xAs$ | 2 | 9 | 412 | 2167 |
| ZnSe | 3 | 10 | 401 | 436 |
| ZnTe | 3 | 11 | 441 | 551 |
| InN | 2 | 11 | 430 | 620 |
| $In_xGa_{1-x}N$ | 2 | 11 | 430 | 620 |

FIG. 9

OPTICAL WAVEGUIDE SYSTEM

CROSS-REFERENCE TO RELATED APPLICATION

This application is based upon and claims the benefit of priority from prior Japanese Patent Application No. 2008-189876 filed on Jul. 23, 2008 in Japan, the entire contents of which are incorporated herein by reference.

BACKGROUND OF THE INVENTION

1. Field of the Invention

The present invention relates to an optical waveguide system.

2. Related Art

Surface plasmon is an electromagnetic wave mode observed in the boundary surface between a metal and a dielectric material or air, and has characteristics that electromagnetic waves are localized in the regions in a size of the light diffraction limit or smaller along the surface and are reinforced. Taking advantage of such characteristics, applied researches have been recently made in the fields of nanophotonics, biotechnology, and the like. In the leading edge of those researches, metal nanoparticles of nano-order size having a higher area ratio with respect to volume are applied as plasmon excitation media. Such electromagnetic wave mode is known as localized surface plasmon. Particularly, a method for transmitting plasmon polariton, using the metal nanoparticles, as electromagnetic wave signals through an optical waveguide is being actively studied. To realize such an application, various methods for generating plasmon polariton are being studied, as well as the research of methods for manufacturing metal nanoparticles are advanced.

Also, near-field optical probes having various shapes and characteristics are being studied in order to reduce the loss when converting the light from a light source into plasmon polariton (refer to Reference 1 (T. Saiki, S. Mononobe, M. Ohtsu, N. Saito, and J. Kusano, Appl. Phys. Lett. 68, 2612 (1996)), for example). Reference 1 discloses a double tapered near-field optical probe that has high resolution and high optical propagation efficiency. In this probe, the sharp tip angle in the region where the cross-sectional diameter of the sharp tip portion becomes equal to or smaller than the optical wavelength is made greater than the sharp tip angle in the vicinity of the probe root so as to make the distance to the tip end as short as possible.

The most common method for generating plasmon polariton in the field is a method for exciting plasmon polariton by converting propagated light of a light source into near-field light. In this method utilizing a tapered near-field optical probe, a nanometer-order location control device and a processing technique are necessary. There is also a problem with a near-field light emitting device such as a near-field optical probe in that its conversion efficiency is as low as an order of $10^{-4}$.

Surface plasmon antennas, each of which has a metal thin-film surface fine-processed into a concentric circle, are also being actively studied, as opposed to tapered near-field optical probes. With such a surface plasmon antenna, surface plasmons are concentrated to a localized region (a region having a diameter of 300 nm, for example) in a center of concentric circles, so as to generate near-field light. The results of measurement carried out in the region where the surface plasmons are concentrated with use of a Si nano-photodiode show efficiency improvement by one order of magnitude (refer to Reference 2 (T. Ishi, J. Fujikata, K. Makita, T. Baba, and K. Ohashi, "Si Nano-Photodiode with a Surface Plasmon Antenna" Jpn. J. Appl. Phys. 44, L364-L366 (2005)), for example).

Likewise, there has been a technique for gathering surface plasmons generated from propagated light through a diffraction grating to a localized region (one end of a nanodot coupler in this case) with use of a surface plasmon polariton capacitor formed with several metal fine particles arranged in semicircle (refer to Reference 3 (W. Nomura, M. Ohtsu, and T. Yatsui, Appl. Phys. Lett. 86, 181108 (2005)), for example). There is also a known technique for exciting surface plasmons in a film structure according to an attenuated total reflection (ATR) method for generating surface plasmons in a metal thin film applied to or located in the vicinity of a prism total-reflection face through the near-field light generated from propagated light on the prism total-reflection face (refer to Reference 4 (H. Raether, Surface Plasmons on Smooth and Rough Surfaces and on Gratings, (Springer-Verlag Berlin Heidelberg) 1988), for example).

As a more direct coupling technique, there is proposed a technique for exciting plasmons in one-dimensionally arranged nanoparticles by irradiating propagation light gathered by a lens to one end of the nanoparticles (refer to JP-A 2006-171479 (KOKAI), for example).

There is also proposed a highly refractive embedded and tapered "high-mesa" optical waveguide (refer to JP-A 2002-311262 (KOKAI), for example).

By such top-down fine processing techniques, however, it is necessary to prepare an expensive fine processing apparatus such as an electron beam lithography apparatus, and the production costs become higher when optical waveguide systems are mass-produced. Furthermore, the wavelength controllability of the light introduced into the waveguide is limited by the structure of each optical waveguide system. Also, phase matching is necessary to couple propagated light to near-field light.

As opposed to the above-described top-down techniques, there is provided a technique by which quantum dots are mixed as a gain material with metal nanoparticles or a inorganic hybrids (refer to Reference 5 (D. Parekh, L. Thylen, and C. J. Chang-Hasnain, "Metal nanoparticle and quantum dot metamaterials for near resonant surface plasmon waveguides", Nano-Optoelectronics Workshop, 2007, I-NOW '07. International, Jul. 29, 2007—Aug. 11, 2007, p.p. 150-151), for example). With the technique disclosed in Reference 5, it is possible to locate quantum dots three-dimensionally mixed in a structure having metal nanoparticles dispersed therein, and thus to reduce the light loss in the waveguide by the quantum dots (the gain material). Accordingly, the waveguide distance is made longer according to Reference 5. Further, Reference 5 discloses that the emission wavelength selectivity defined by the size and material of the quantum dots contribute to the gain.

As described above, a system that converts light propagated from light sources of various wavelengths into near-field light, and couple the near-field light to an optical waveguide becomes complicated in structure. Also, phase matching is necessary, and the conversion efficiency is low. Furthermore, the light emitted from the light source has no directivity along a desired propagation direction from an end of the waveguide.

SUMMARY OF THE INVENTION

The present invention has been made in view of these circumstances, and an object thereof is to provide an optical waveguide system that has a coupling mechanism capable of selecting a wavelength and has the highest possible conversion efficiency, and that is capable of providing directivity in the light propagation direction.

An optical waveguide system according to an aspect of the present invention includes: a three-dimensional photonic crystalline structure including crystal pillars and having a hollow structure inside thereof; an optical waveguide in which a plurality of metal nanoparticles are dispersed in a dielectric material, the optical waveguide having an end portion inserted between the crystal pillars of the three-dimensional photonic crystalline structure, and containing semiconductor quantum dots that are located adjacent to the metal nanoparticles and emit near-field light when receiving excitation light, the metal nanoparticles exciting surface plasmon when receiving the near-field light; and an excitation light source that emits the excitation light for exciting the semiconductor quantum dots.

BRIEF DESCRIPTION OF THE DRAWINGS

FIG. 9 is a table showing material, minimum radius (nm), maximum radius (nm), shortest emission wavelength (nm), and longest emission wavelength (nm) of each of semiconductor quantum dots used in Examples 4 through 23.

DETAILED DESCRIPTION OF THE INVENTION

The following is a description of embodiments of the present invention, with reference to the accompanying drawings.

First Embodiment

Figure 1:
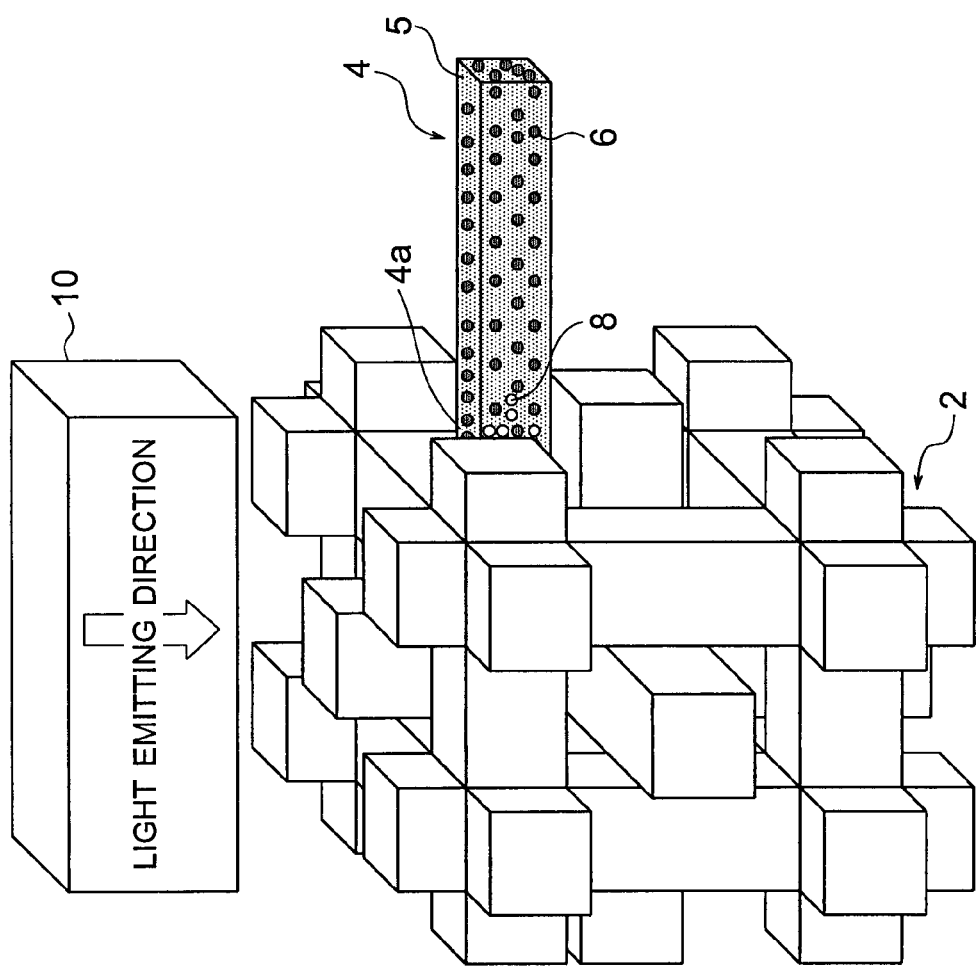
FIG. 1 is a perspective view of an optical waveguide system according to a first embodiment.
Figure 2:
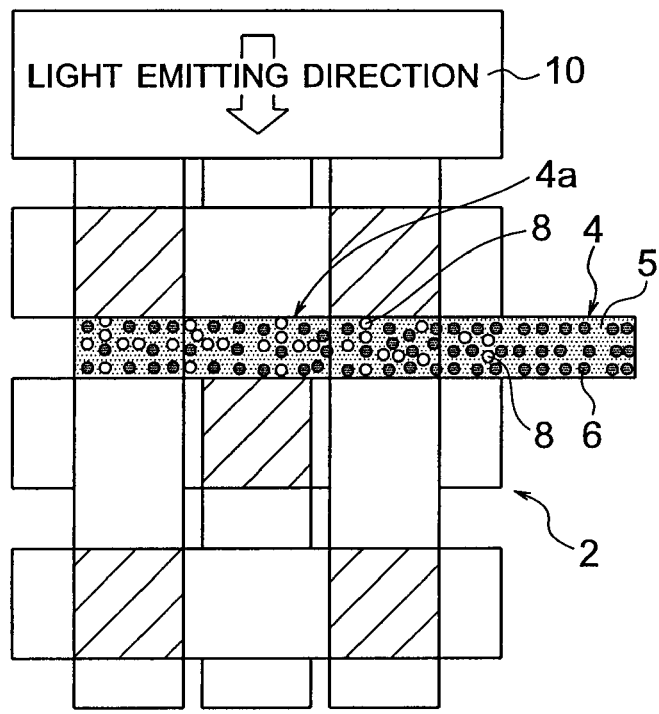
FIG. 2 is a vertical cross-sectional view of the optical waveguide system according to the first embodiment.

FIGS. 1 and 2 show an optical waveguide system in accordance with a first embodiment of the present invention. FIG. 1 is a perspective view of the optical waveguide system of the embodiment. FIG. 2 is a vertical cross-sectional view of the optical waveguide system, taken in an extending direction of the optical waveguide of FIG. 1.

The optical waveguide system of the embodiment includes: a three-dimensional photonic crystalline structure 2 having a hollow structure inside thereof; an optical waveguide 4 having an end portion 4a inserted between crystals in the hollow structure of the three-dimensional photonic crystalline structure 2; and an excitation light source 10. The optical waveguide 4 has a structure in which metal nanoparticles (such as silver nanoparticles) 6 of nanometer size evenly dispersed in a dielectric material (such as $SiO_2$) 5. In the end portion 4a inserted in the photonic crystalline structure 2, not only the metal nanoparticles but also semiconductor quantum dots 8 serving as dipole light sources are dispersed. The excitation light source 10 is placed above the three-dimensional photonic crystalline structure 2 to irradiate excitation light to the semiconductor quantum dots 8 in the end portion 4a of the optical waveguide 4 so as to excite the semiconductor quantum dots 8, and thereby generating near-field light. Therefore, the excitation light source 10 is arranged in such a manner that it can irradiate excitation light onto a side face of the end portion 4a of the optical waveguide 4 that is substantially parallel to the extending direction of the optical waveguide 4. When the excitation light is irradiated to the semiconductor quantum dots 8, not only the near-field light but also propagation light of the same wavelength as the near-field light is generated. The photonic structure is designed in such a manner that the near-field light and the propagation light generated from the semiconductor quantum dots 8 do not leak outside of the photonic crystalline structure 2, however the excitation light can enter into the photonic crystalline structure. More specifically, the photonic structure is designed to make the wavelength of the light generated from the semiconductor quantum dots within the photonic bandgap, and the wavelength of the excitation light above the band. The near-field light generated from the semiconductor quantum dots 8 is irradiated to the metal nanoparticles 6 in the vicinities of the semiconductor quantum dots 8 to generate plasmon from the metal nanoparticles 6. The plasmon is then propagated via the metal nanoparticles 6 dispersed in the optical waveguide 4.

In such configured optical waveguide system of the embodiment, the semiconductor quantum dots 8 serving as dipole light sources exist at the end portion 4a of the optical waveguide 4 into which external light enters. The semiconductor quantum dots 8 are excited by the excitation light source 10. The semiconductor quantum dots 8 emit light having a wavelength defined by the material, structure, and size of the semiconductor quantum dots 8. The emitted light is confined in the optical waveguide 4 due to the photonic crystalline structure 2. At this point, coupling to the metal nanoparticles 6 adjacent to the semiconductor quantum dots 8 is realized as near-field components, and the light is propagated in the extending direction of the optical waveguide 4. The density of the propagated light is controlled so as to increase the conversion efficiency in the optical waveguide 4.

Here, it is preferable that the semiconductor quantum dots 8 are made of a material that can be mixed in a solvent. The semiconductor quantum dots 8 may be mixed throughout the optical waveguide 4, however it is preferable that the quantum dots are mixed in the end portion 4a of the optical waveguide 4, into which light is enters, and the density of the quantum dots can be controlled. It is also preferable that each of the semiconductor quantum dots 8 is a single dot or has a core-shell structure, and the wavelength of emitted light can be controlled by adjusting the combination of the materials of the dots. It is preferable that the wavelength of the emitted light matches with the resonant wavelength of plasmon polariton. It is also preferable that the semiconductor quantum dots 8 have the size of the same order as the metal nanoparticles 6.

It is preferable that the excitation light source 10 is a light source having high wavelength selectivity that can be produced by an existing semiconductor fine-processing technique or a semiconductor microcrystallite growth technique. It is also preferable that the excitation light source 10 is a light source that oscillates at a shorter wavelength than the emission wavelength of the semiconductor quantum dots 8. It is further preferable that the excitation light source 10 is a light source that causes the photonic crystalline structure 2 to oscillate at a wavelength to be less absorbed or reflected. It is also preferable that the defect mode wavelength of the photonic crystalline structure 2 is close to or the same as the emission wavelength of the semiconductor quantum dots 8. The material forming the photonic crystalline structure 2 may be a semiconductor such as GaAs or GaN, or a dielectric material such as $TiO_2$. The photonic crystalline structure may be formed by a known technique such as the technique disclosed in a reference (JOURNAL OF LIGHTWAVE TECHNOLOGY, VOL. 17, p 1948). With this method, a three-dimensional photonic crystalline structure having a hollow structure inside can be formed. In the hollow structure of the three-dimensional photonic crystalline structure, the hollow regions other than the region where the optical waveguide 4 is inserted may be filled only with the dielectric material (such as $SiO_2$) 5 forming the optical waveguide 4.

Figure 3:
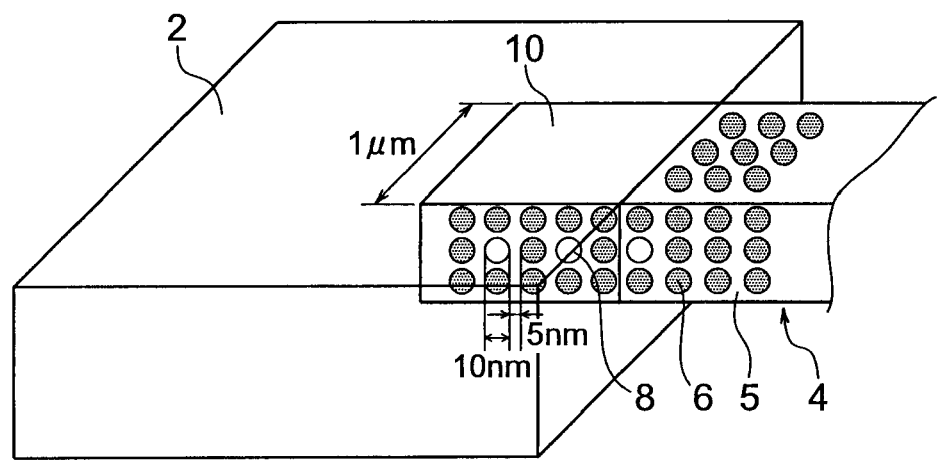
FIG. 3 is a diagram for explaining metal nanoparticles and semiconductor quantum dots in the optical waveguide according to the first embodiment.

Referring now to FIG. 3, a method for manufacturing the optical waveguide system of the embodiment is described. As shown in FIG. 3, the three-dimensional photonic crystalline structure having the hollow structure inside is first manufactured. A mask (not shown) that has an opening of the same size as each crystal pillar interval (1 μm, for example) in the hollow structure of the three-dimensional photonic structure is formed on a side face of the three-dimensional photonic crystalline structure 2 in the FIG. 3 to mach the opening with one of the spaces between the crystal pillars. Through the opening, the $SiO_2$ portion 5 having the metal nanoparticles 6 and the semiconductor quantum dots 8 dispersed therein is buried in the corresponding space between the crystal pillars of the three-dimensional crystalline structure to form the end portion 4a of the optical waveguide 4. The opening is then filled with the $SiO_2$ portion 5 having the metal nanoparticles 6 dispersed therein, so as to complete the portion of the optical waveguide 4 other than the end portion 4a. In such formed optical waveguide 4, the metal nanoparticles 6 made of silver, and having a diameter of 10 nm, are arranged at 5 nm intervals in the $SiO_2$ portion 5. The semiconductor dots 8, each of which has a diameter of 10 nm, are arranged adjacent to the metal nanoparticles 6, and each keep a distance of approximately 5 nm from each corresponding metal nanoparticle 6.

Other than Ag, Au, Pb, Ti, Al, Cu, In, Ir, W, Cr, Ni, Fe, Co, Zn, Ge, Sn, Mn, Mo, Bi, or the like may be used for the metal nanoparticles.

The semiconductor quantum dots 8 are made of a crystalline material or a mixed crystalline material formed with one of group IV semiconductors (Si and Ge), group III-V compound semiconductors (GaAs, AlAs, InAs, GaP, InP, GaSb, AlSb, InSb, $Al_xGa_{1-x}As$, $GaAs_{1-x}Sb_x$, $In_{1-x}Ga_xP$, $In_{1-x}Ga_xAs$, InN, and $In_xGa_{1-x}N$), and group II-VI compound semiconductors (CdSe, CdS, ZnSe, and ZnTe). The emission wavelength of such a material is 400 nm at a minimum, and is 5330 nm at a maximum.

The short-wavelength limit (400 nm) is set for the following reasons. In the optical waveguide having metal nanoparticles dispersed therein, the shortest optical wavelength, to which the optical response of the metal nanoparticles (silver or gold) is metallic, is 400 nm. To wavelengths shorter than that, the optical response is not metallic, and plasmon is not generated.

The longest-wavelength limit (5330 nm) is set for the following reasons. When the quantum level spacing of the semiconductor quantum dots becomes smaller than thermal energy at room temperature (300 K), the levels of the semiconductor quantum dots become indiscrete, and the semiconductor quantum dots may not function as light sources. The quantum level spacing becomes smaller, as the emission wavelength becomes longer. Therefore, the maximum wavelength among the materials selected as the material for the semiconductor quantum dots is 5330 nm, and the wavelength of 5330 nm is set as the long-wavelength limit.

In the optical waveguide system of the embodiment, the electromagnetic field is guided only in the optical wave guided direction (the extending direction) of the optical waveguide 4.

In the embodiment, the excitation light is converted into the near-field light by the semiconductor quantum dots 8, and the near-field light does not leak outside of the three-dimensional photonic crystalline structure 2. Thus, the conversion efficiency can be made as high as possible.

The wavelength to be guided through the optical waveguide 4 can be selected by appropriately selecting the material for the semiconductor quantum dots 8.

With the embodiment, an optical waveguide system that has a coupling mechanism capable of selecting a wavelength and has the highest possible conversion efficiency, and that is capable of providing directionality in the light propagation direction, as described above. The optical waveguide system of the embodiment is useful when used in the optical wirings in a substrate plane.

In conventional cases, phase matching is necessary in coupling of propagation light to near-field light. In the optical waveguide system of the embodiment however, the semiconductor quantum dots capable of selecting a wavelength and capable of improving conversion efficiency with density control is used as a tiny light source for coupling in order to couple the near-field components of the light emitted from the excited semiconductor quantum dots to the metal nanoparticles. Thus, phase matching is not necessary in coupling to propagation light (excitation light).

Second Embodiment

Figure 4:
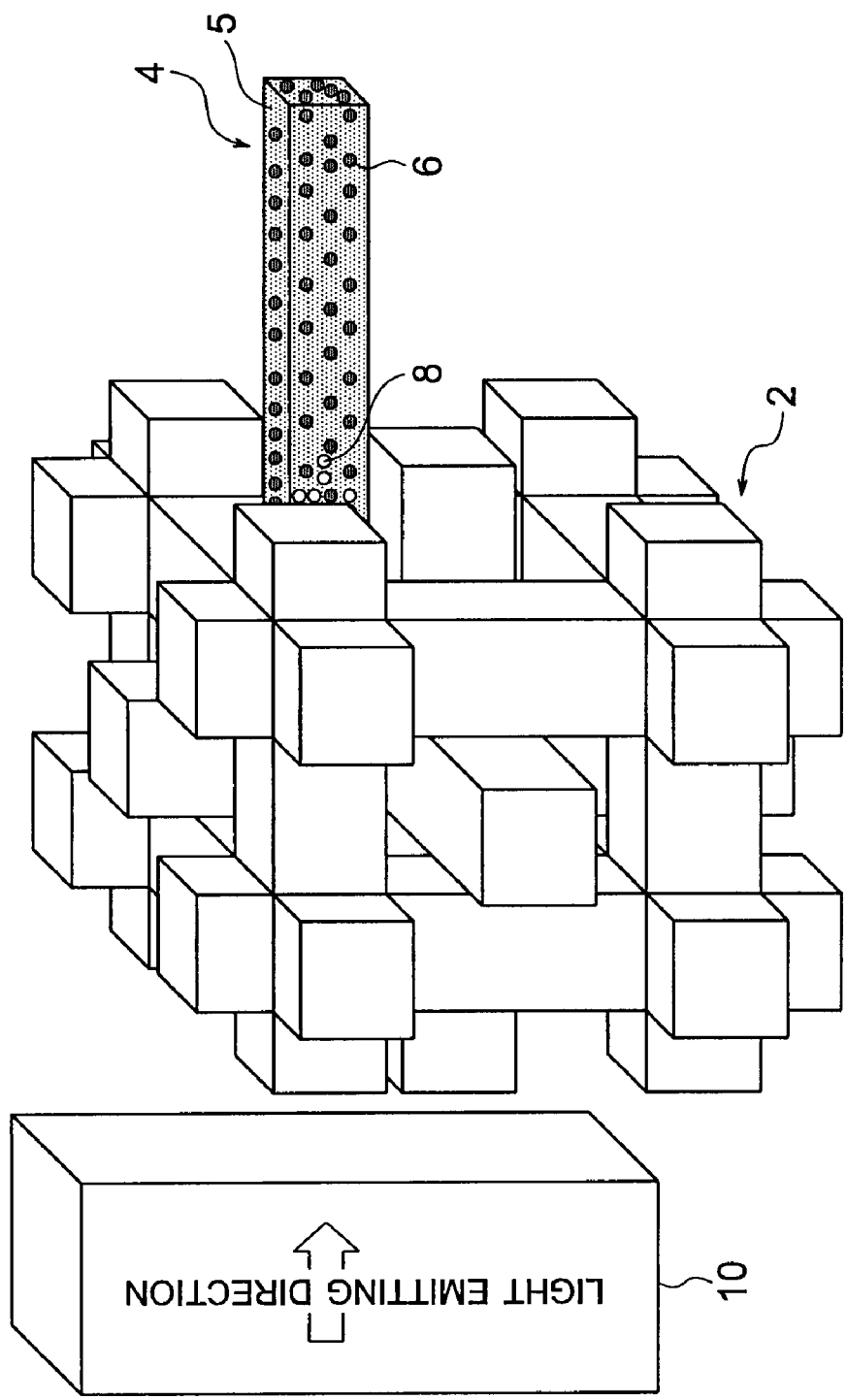
FIG. 4 is a perspective view of an optical waveguide system according to a second embodiment.
Figure 5:
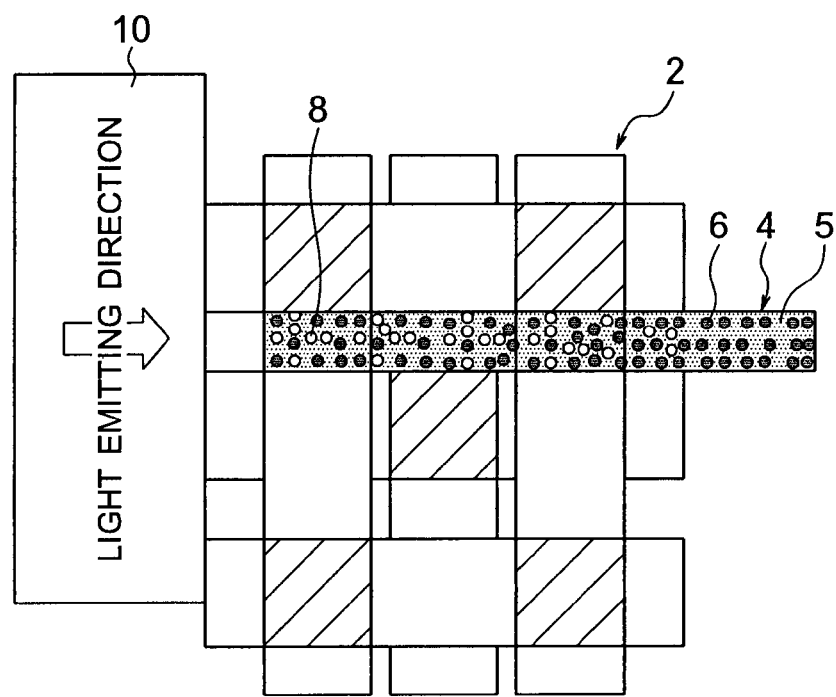
FIG. 5 is a vertical cross-sectional view of the optical waveguide system according to the second embodiment.

FIGS. 4 and 5 show an optical waveguide system accordance with a second embodiment of the present invention. FIG. 4 is a perspective view of the optical waveguide system of the embodiment. FIG. 5 is a vertical cross-sectional view of the optical waveguide system, taken in an extending direction of the optical waveguide of FIG. 4.

The optical waveguide system of the embodiment is the same as the optical waveguide system of the first embodiment shown in FIGS. 1 through 3, except that the excitation light source 10 is not placed above the upper face of the three-dimensional photonic crystalline structure 2, but is placed on a side face side of the three-dimensional photonic crystalline structure 2 so that the face of the excitation light source 10 emitting excitation light faces the end face substantially perpendicular to the end face (or the direction in which plasmon is guided (the direction in which the optical waveguide 4 extends)) of the end portion 4a of the optical waveguide 4. In short, the excitation light source 10 is placed so as to emit excitation light to the end face of the end portion 4a of the optical waveguide 4 that is perpendicular to the direction in which the optical waveguide 4 extends.

Figure 6:
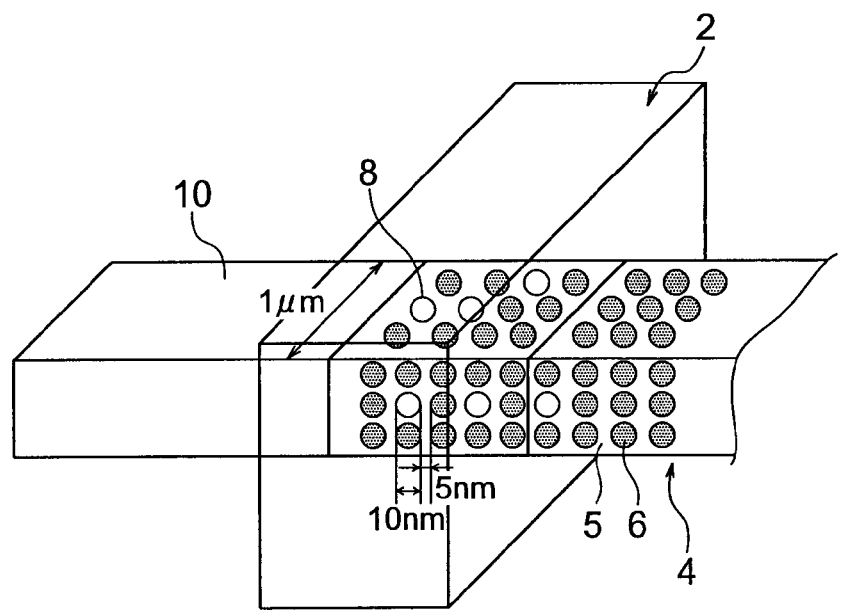
FIG. 6 is a diagram for explaining metal nanoparticles and semiconductor quantum dots in the optical waveguide according to the second embodiment.

In the embodiment, optical waveguide system may be configured in such manner that the end portion 4a of the optical waveguide 4 penetrates through the three-dimensional photonic crystalline structure 2, so that the end face of the end portion 4a of the optical waveguide 4 is exposed through the side face of the three-dimensional photonic crystalline structure 2, as shown in FIG. 6.

In the embodiment, the metal nanoparticles 6 and the semiconductor quantum dots 8 in the optical waveguide 4 are evenly dispersed in a dielectric material (such as $SiO_2$), similarly to the first embodiment. The metal nanoparticles 6 and the semiconductor quantum dots 8 may be made of the same materials as those used in the first embodiment.

In the optical waveguide system of the embodiment, the electromagnetic field is guided only in the optical-wave guided direction of the optical waveguide 4 (the direction in which the optical waveguide 4 extends).

In the embodiment, the excitation light is converted into the near-field light by the semiconductor quantum dots 8, and the converted near-field light does not leak outside of the three-dimensional photonic crystalline structure 2. Thus, the conversion efficiency can be made as high as possible.

The wavelength to be guided through the optical waveguide 4 can be selected by appropriately selecting the material for the semiconductor quantum dots 8.

With the embodiment, an optical waveguide system that has a coupling mechanism capable of selecting a wavelength and has the highest possible conversion efficiency, and that is capable of providing directionality in the light propagation direction, as described above. The optical waveguide system of the embodiment is useful when used in the optical wirings vertically penetrating a substrate plane.

EXAMPLES

Next, examples of the present invention will be described.

Example 1

An optical waveguide system in accordance with Example 1 of the present invention is the optical waveguide system of the second embodiment shown in FIGS. 4 through 6 wherein the dielectric material of the optical waveguide 4 is $SiO_2$, the metal nanoparticles 6 are silver nanoparticles of 10 nm in diameter and are dispersed at 5 nm intervals in the dielectric material, the semiconductor dots 8 are formed with a Ge material and are of 8 nm in diameter, each of the semiconductor dots 8 is arranged at a distance of approximately 5 nm from each corresponding silver nanoparticles. It is reported that the Ge quantum dots have a bandgap of a direct transition type due to the quantum size effect (disclosed in Journal of Chemical Physics, VOL. 101, p. 1607, for example). The wavelength of the excitation light from the excitation light source 10 is shorter than the wavelength of the light emitted from the semiconductor quantum dots 8 (1.57 μm), and is longer than the wavelength that is increasingly absorbed by the material forming the three-dimensional photonic crystalline structure 2 (870 nm).

Figure 7:
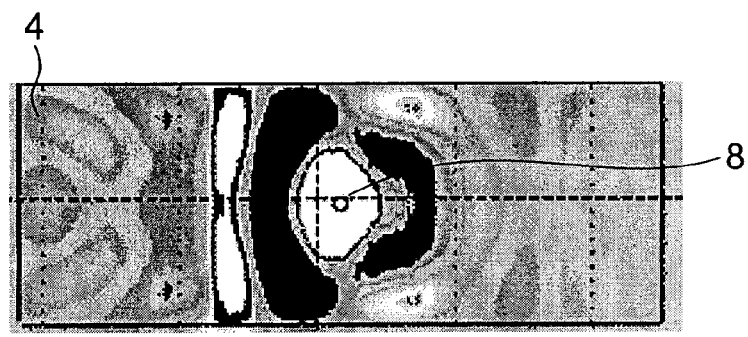
FIG. 7 is a photograph showing results of observations of the guided wave, in the optical waveguide 4, of plasmon generated from the semiconductor quantum dots.
Figure 8:
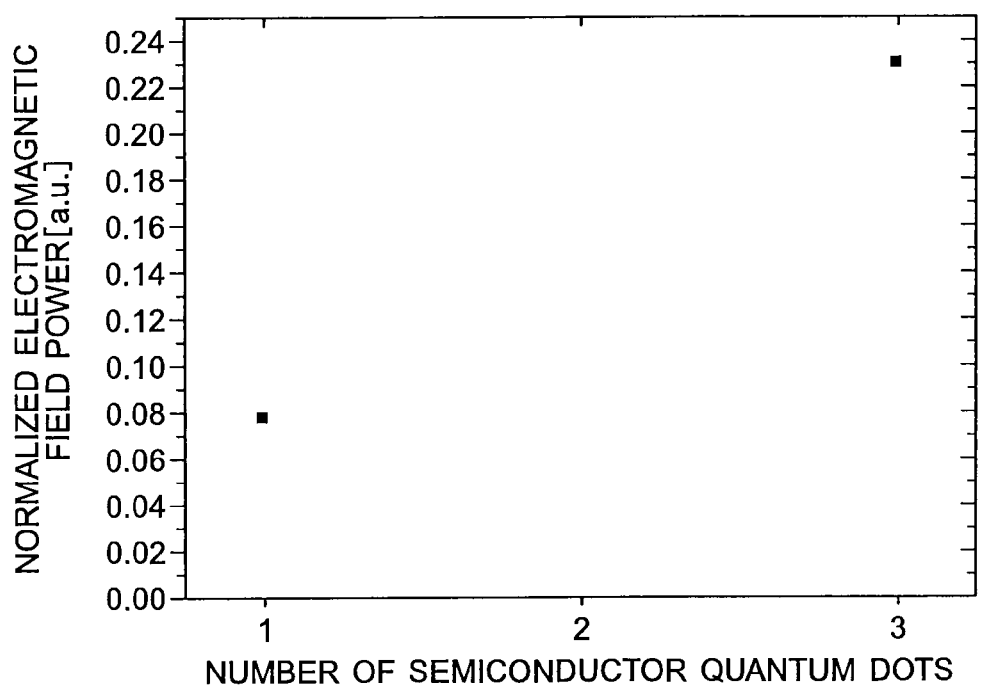
FIG. 8 is a diagram showing the relationship between the number of semiconductor quantum dots in the optical waveguide and the electromagnetic field power.

When receiving excitation light, the semiconductor quantum dots 8 generate near-field light having a wavelength of 1.57 μm. Due to the near-field light, the silver nanoparticles 6 generate plasmon, and it is observed that the plasmon (electromagnetic field) is guided in the optical waveguide 4 approximately 1 μm. FIG. 7 shows the result of the observation. To eliminate quantum-mechanical coupling between the quantum dots 8, the upper limit is set on the density of the quantum dots 8, so that the silver nanoparticles 6 necessarily exist adjacent to the quantum dots 8. Further it is observed that as the number of semiconductor quantum dots 8 serving as the dipole light sources is increased, in the strength of the electromagnetic field power propagating in the optical waveguide 4 (see FIG. 8) is increased. FIG. 8 shows the number of semiconductor quantum dots and the electromagnetic field energy density in the optical waveguide 4 at a distance of 1 μm from the respective semiconductor quantum dots. Three quantum dots 8 are arranged at 100 nm intervals. As the number of semiconductor quantum dots 8 increases, the electromagnetic field energy density in the optical waveguide 4 becomes higher in a linear form. Accordingly, the coupling efficiency in the optical waveguide 4 becomes higher, as the number of tiny light sources (the semiconductor quantum dots 8) increases. If the spacing between the semiconductor quantum dots 8 is too small in the optical waveguide 4, the characteristics such as the emission wavelength are varied due to quantum-mechanical coupling. To counter this problem, at least one metal nanoparticle is interposed between the semiconductor quantum dots 8 in the example. The maximum allowable density determined in this manner is $4 \times 10^{22}$ m$^{-3}$. If the density of the semiconductor quantum dots 8 is higher than $4 \times 10^{22}$ m$^{-3}$, at least two semiconductor quantum dots 8 are adjacent to each other, and the discrete energy levels are varied due to the electron-hole (one electron short) interaction between the adjacent semiconductor quantum dots 8. As a result, the excitation and emission wavelengths of the aggregate of the semiconductor quantum dots 8 are varied, and the semiconductor quantum dots 8 do not function as the desired light sources for the optical waveguide 4 having the metal nanoparticles 6 dispersed therein. Here, it is preferable that the collective emission spectrum of the semiconductor quantum dots 8 is narrow. However, when there exist semiconductor quantum dots 8 adjacent to each other, the collective emission spectrum becomes wider, which is undesirable as the light sources.

If the density of the semiconductor quantum dots 8 is higher than $4 \times 10^{22}$ m$^{-3}$, several semiconductor quantum dots 8 are adjacent to each another, and the electron-hole relaxation process is varied due to the electron-hole interaction between the semiconductor quantum dots 8 and nonradiative relaxation process appears. Due to the nonradiative relaxation process, the emission efficiency of the semiconductor quantum dots 8 becomes lower.

Next, the electromagnetic field power difference between the inside and the outside of the optical waveguide 4 having silver nanoparticles dispersed therein is observed in a case where the photonic crystalline structure 2 is provided to cover the end portion 4a of the optical waveguide 4 and in a case where there is no photonic crystalline structure. The refractive index of the material forming the photonic crystalline structure 2 is 3, and the refractive index of the surrounding medium is 1.43. The material forming the photonic crystalline structure 2 is aligned in the form of hexagonal crystals that have a diameter of 0.365 μm and grid spacing of 0.96 μm. To obtain the photonic crystalline structure 2, a pillar of the six aligned pillars forming the photonic crystalline structure 2 is eliminated and the end portion 4a of the optical waveguide 4 containing the semiconductor quantum dots 8 is placed in the opened space. The semiconductor quantum dots 8 generate near-field light at a wavelength of 1.57 μm. It is observed that when the near-field light is used as the light source, if the photonic crystalline structure 2 exists at the end portion 4a of the optical waveguide 4 the electromagnetic field power is weaker outside the optical waveguide 4 but is stronger in the optical waveguide 4 than in a case where the photonic crystalline structure 2 is not provided. This implies that the leakage of the electromagnetic field power from the optical waveguide 4 having silver nanoparticles dispersed therein is reduced, and the electromagnetic field power propagating in the optical waveguide 4 is increased.

Example 2

Next, an optical waveguide system in accordance with Example 2 of the present invention is described.

The optical waveguide system of this example is the optical waveguide system of the first or second embodiment, wherein the emission wavelength is controlled by changing the discrete level energy difference between electrons and holes with use of the discrete energy levels of the semiconductor quantum dots 8. The emission wavelength control is determined depending on the size (diameter) of the semiconductor quantum dots 8. Practically, the maximum diameter of the semiconductor quantum dots 8 with which electrons and holes are actually confined is 46 nm, however, semiconductor quantum dots 8 having a smaller diameter is used in this example. When excitation light is irradiated to the semiconductor quantum dots 8, the semiconductor quantum dots 8 emit light. If the diameter is greater than 46 nm, the quantum confining effect becomes smaller, and the discrete energy level spacing is not discrete. Therefore, the wave functions of electrons and holes are not localized at the semiconductor quantum dots. As a result, the excitation and light emission processes at the semiconductor quantum dots 8 are not caused, and the characteristics of the semiconductor quantum dots as light sources deteriorate.

In view of the above facts, it is preferable that the diameter of the semiconductor quantum dots is 46 nm or smaller.

Example 3

Next, an optical waveguide system in accordance with Example 3 of the present invention is described. The optical waveguide system of this example is the optical waveguide system of the first or second embodiment, wherein emission wavelengths ranging from the visible region (400 nm) to the infrared region (5330 nm) of the near-field light generated from the semiconductor quantum dots 8 can be achieved by changing the size or material of the semiconductor quantum dots 8. As the light detector, a Si detector is used for detecting light in the range of 400 nm to 1000 nm, an InAs detector is used for detecting light in the range of 1000 nm to 2000 nm, and an InSb detector is used for detecting light in the range of 2000 nm to 5330 nm. Since the emission wavelengths range from 400 nm to 5330 nm, it is possible to cope with excitation of a resonant wavelength of the single-metal nanoparticles 6 (approximately 400 nm to 600 nm), and the wavelength that causes the smallest loss in the optical waveguide 4 having the metal nanoparticles 6 dispersed therein (approximately 400 nm to 5330 nm). Surface plasmon resonance of the single-metal nanoparticles cannot be caused with light of a shorter wavelength than 400 nm. With light of a longer wavelength than 5330 nm, large loss is caused in the optical waveguide 4 having the metal nanoparticles 6 dispersed therein. Accordingly, in the optical waveguide 4 having the metal nanoparticles 6 dispersed therein, near-field light can be guided in a chain-reaction manner by surface plasmon resonance of the single-metal nanoparticles 6 adjacent to the semiconductor quantum dots 8, and an electromagnetic field of the wavelength causing the smallest loss in the optical waveguide 4 having the metal nanoparticles 6 dispersed therein can be guided.

Surface plasmon resonance of the single-metal nanoparticles 6 cannot be caused with light of a shorter wavelength than 400 nm. However, the wavelength of the surface plasmon resonance can be between 400 nm and 600 nm by changing the material of the single-metal nanoparticles 6, or the material, sizes or shapes of the neighboring dielectric material. In this case, surface plasmon resonance of the single-metal nanoparticles can be caused with use of the semiconductor quantum dots 8 that can emit light at the wavelength.

With light of a longer wavelength than 5330 nm, large loss is caused in the optical waveguide 4 having the metal nanoparticles 6 dispersed therein. However, by changing the material of the metal nanoparticles 6 in the optical waveguide 4, or the material, sizes or spacing of the neighboring dielectric material, the wavelength that causes the smallest loss in the optical waveguide can be between 400 nm and 5330 nm. In this case, an electromagnetic field of the wavelength causing the smallest loss can be guided with use of the semiconductor quantum dots 8 that can emit light at the wavelength.

Example 4

Next, an optical waveguide system in accordance with Example 4 of the present invention is described. The optical waveguide system of this example is the optical waveguide system of the first or second embodiment wherein the discrete energy levels of the semiconductor quantum dots 8 are used, a group IV semiconductor of Si is used as the quantum dot material, and the semiconductor quantum dots having radius in the range of 1 nm to 7 nm are used. Here, the semiconductor quantum dots having the same size are used in the optical waveguide. With this arrangement, an optical waveguide system having an emission wavelength of 557 nm to 1080 nm is obtained. Accordingly, it is possible to achieve the wavelength that can cause resonance of the single-metal nanoparticles 6 and cause the smallest loss in the optical waveguide 4 having the metal nanoparticles dispersed therein. Thus, in the optical waveguide 4 having the metal nanoparticles dispersed therein, near-field light can be guided in a chain-reaction manner by causing surface plasmon resonance of the single-metal nanoparticles 6 adjacent to the semiconductor quantum dots 8, and an electromagnetic field of the wavelength that causes the smallest loss in the optical waveguide 4 having the metal nanoparticles dispersed therein can be guided.

As in Example 3, surface plasmon resonance of the single-metal nanoparticles 6 cannot be caused with light of a shorter wavelength than 400 nm in the example. However, the wavelength of the surface plasmon resonance can be between 400 nm and 600 nm by changing the material of the single-metal nanoparticles 6, or the material, sizes or shapes of the neighboring dielectric material. In this case, surface plasmon resonance of the single-metal nanoparticles can be caused with use of the semiconductor quantum dots 8 that can emit light at the wavelength. With light of a longer wavelength than 5330 nm, large loss is caused in the optical waveguide 4 having the metal nanoparticles 6 dispersed therein. However, by changing the material of the metal nanoparticles in the optical waveguide 4, or the material, sizes and spacing of the neighboring dielectric material, the wavelength that causes the smallest loss in the optical waveguide can be between 400 nm and 5330 nm. In this case, an electromagnetic field of the wavelength causing the smallest loss can be guided with use of the semiconductor quantum dots 8 that can emit light at the wavelength.

Comparative Example

In a comparative example of Example 4, Si semiconductor quantum dots, each of which has a radius greater than 7 nm, are used as the semiconductor quantum dots in the optical waveguide system of Example 4. In the optical waveguide system of this comparative example, the discrete quantum level spacing of the semiconductor quantum dots becomes smaller than 4.14 meV, which is the heat fluctuation (kT) at room temperature (300 K). Therefore, the discrete quantum levels of the semiconductor quantum dots do not function as discrete levels, and the desired light emission cannot be achieved. Here, k represents the Boltzmann's constant, and T represents the absolute temperature.

Example 5

Next, an optical waveguide system in accordance with Example 5 of the present invention is described. The optical waveguide system of the example is the optical waveguide system of the first or second embodiment, wherein the discrete energy levels of the semiconductor quantum dots 8 are used, a group IV semiconductor of Ge is used as the quantum dot material, and the semiconductor quantum dots are in the range of 1 nm to 8 nm in radius. Here, the semiconductor quantum dots having the same size are used in the optical waveguide. With this arrangement, an optical waveguide system having an emission wavelength of 556 nm to 1811 nm is obtained. Accordingly, it is possible to achieve the wavelength that can cause resonance of the single-metal nanoparticles 6 and cause the smallest loss in the optical waveguide 4 having the metal nanoparticles 6 dispersed therein. Thus, in the optical waveguide 4 having the metal nanoparticles 6 dispersed therein, near-field light can be guided in a chain-reaction manner by causing surface plasmon resonance of the single-metal nanoparticles 6 adjacent to the semiconductor quantum dots 8, and an electromagnetic field of the wavelength that causes the smallest loss in the optical waveguide 4 having the metal nanoparticles 6 dispersed therein can be guided.

As in Example 3, surface plasmon resonance of the single-metal nanoparticles 6 cannot be caused with light of a shorter wavelength than 400 nm in the example. However, the wavelength of the surface plasmon resonance can be between 400 nm and 600 nm by changing the material of the single-metal nanoparticles 6, or the material, sizes or shapes of the neighboring dielectric material. In this case, surface plasmon resonance of the single-metal nanoparticles can be caused with use of the semiconductor quantum dots 8 that can emit light at the wavelength. With light of a longer wavelength than 5330 nm, large loss is caused in the optical waveguide 4 having the metal nanoparticles 6 dispersed therein. However, by changing the material of the metal nanoparticles 6 in the optical waveguide 4, or the material, sizes or spacing of the neighboring dielectric material, the wavelength that causes the smallest loss in the optical waveguide can be between 400 nm and 5330 nm. In this case, an electromagnetic field of the wavelength causing the smallest loss can be guided with use of the semiconductor quantum dots 8 that can emit light at the wavelength.

Comparative Example

In a comparative example of Example 5, Ge quantum dots, each of which has a radius greater than 8 nm, are used as the semiconductor quantum dots 8 in the optical waveguide system of Example 5. In the optical waveguide system of the comparative example, the discrete quantum level spacing of the semiconductor quantum dots becomes smaller than 4.14 meV, which is the heat fluctuation (kT) at room temperature (300 K). Therefore, the discrete quantum levels of the semiconductor quantum dots do not function as discrete levels, and the desired light emission cannot be achieved.

Example 6

Next, an optical waveguide system in accordance with Example 6 of the present invention is described. The optical waveguide system of the example is the optical waveguide system of the first or second embodiment, wherein the discrete energy levels of the semiconductor quantum dots 8 are used, a group III-V compound semiconductor of GaAs is used as the quantum dot material, and the semiconductor quantum dots are in the range of 2 nm to 14 nm in radius. Here, the semiconductor quantum dots having the same size are used in the optical waveguide. With this arrangement, an optical waveguide system having an emission wavelength of 412 nm to 854 nm is obtained. Accordingly, it is possible to achieve the wavelength that can cause resonance of the single-metal nanoparticles 6 and cause the smallest loss in the optical waveguide 4 having the metal nanoparticles 6 dispersed therein. Thus, in the optical waveguide 4 having the metal nanoparticles 6 dispersed therein, near-field light can be guided in a chain-reaction manner by causing surface plasmon resonance of the single-metal nanoparticles 6 adjacent to the semiconductor quantum dots 8, and an electromagnetic field of the wavelength that causes the smallest loss in the optical waveguide 4 having the metal nanoparticles 6 dispersed therein can be guided.

As in Example 3, surface plasmon resonance of the single-metal nanoparticles 6 cannot be caused with light of a shorter wavelength than 400 nm in the example. However, the wavelength of the surface plasmon resonance can be between 400 nm and 600 nm by changing the material of the single-metal nanoparticles 6, or the material, sizes or shapes of the neighboring dielectric material. In this case, surface plasmon resonance of the single-metal nanoparticles can be caused with use of the semiconductor quantum dots 8 that can emit light at the wavelength. With light of a longer wavelength than 5330 nm, large loss is caused in the optical waveguide 4 having the metal nanoparticles 6 dispersed therein. However, by changing the material of the metal nanoparticles 6 in the optical waveguide 4, or the material, sizes or spacing of the neighboring dielectric material, the wavelength that causes the smallest loss in the optical waveguide can be between 400 nm and 5330 nm. In this case, an electromagnetic field of the wavelength causing the smallest loss can be guided with use of the semiconductor quantum dots 8 that can emit light at the wavelength.

Comparative Example

In a comparative example of Example 6, GaAs semiconductor quantum dots, each of which has a radius greater than 14 nm, are used as the semiconductor quantum dots 8 in the optical waveguide system of Example 6. In the optical waveguide system of the comparative example, the discrete quantum level spacing of the semiconductor quantum dots becomes smaller than 4.14 meV, which is the heat fluctuation (kT) at room temperature (300 K). Therefore, the discrete quantum levels of the semiconductor quantum dots do not function as discrete levels, and the desired light emission cannot be achieved.

Example 7

Next, an optical waveguide system in accordance with Example 7 of the present invention is described. The optical waveguide system of the example is the optical waveguide system of the first or second embodiment, wherein the discrete energy levels of the semiconductor quantum dots 8 are used, a group III-V compound semiconductor of AlAs is used as the quantum dot material, and the semiconductor quantum dots are in the range of 2 nm to 11 nm in radius. Here, the semiconductor quantum dots having the same size are used in the optical waveguide 4. With this arrangement, an optical waveguide system having an emission wavelength of 418 nm to 570 nm is obtained. Accordingly, it is possible to achieve the wavelength that can cause resonance of the single-metal nanoparticles 6 and cause the smallest loss in the optical waveguide 4 having the metal nanoparticles 6 dispersed therein. Thus, in the optical waveguide 4 having the metal nanoparticles 6 dispersed therein, near-field light can be guided in a chain-reaction manner by causing surface plasmon resonance of the single-metal nanoparticles 6 adjacent to the semiconductor quantum dots 8, and an electromagnetic field of the wavelength that causes the smallest loss in the optical waveguide 4 having the metal nanoparticles 6 dispersed therein can be guided.

As in Example 3, surface plasmon resonance of the single-metal nanoparticles 6 cannot be caused with light of a shorter wavelength than 400 nm in this example. However, the wavelength of the surface plasmon resonance can be between 400 nm and 600 nm by changing the material of the single-metal nanoparticles 6, or the material, sizes or shapes of the neighboring dielectric material. In this case, surface plasmon resonance of the single-metal nanoparticles can be caused with use of the semiconductor quantum dots 8 that can emit light at the wavelength. With light of a longer wavelength than 5330 nm, large loss is caused in the optical waveguide 4 having the metal nanoparticles 6 dispersed therein. However, by changing the material of the metal nanoparticles 6 in the optical waveguide 4, or the material, sizes or spacing of the neighboring dielectric material, the wavelength that causes the smallest loss in the optical waveguide can be between 400 nm and 5330 nm. In this case, an electromagnetic field of the wavelength causing the smallest loss can be guided with use of the semiconductor quantum dots 8 that can emit light at the wavelength.

Comparative Example

In a comparative example of Example 7, AlAs semiconductor quantum dots, each of which has a radius greater than 11 nm, are used as the semiconductor quantum dots 8 in the optical waveguide system of Example 7. In the optical waveguide system of the comparative example, the discrete quantum level spacing of the semiconductor quantum dots becomes smaller than 4.14 meV, which is the heat fluctuation (kT) at room temperature (300 K). Therefore, the discrete quantum levels of the semiconductor quantum dots do not function as discrete levels, and the desired light emission cannot be achieved.

Example 8

Next, an optical waveguide system in accordance with Example 8 of the present invention is described. The optical waveguide system of the example is the optical waveguide system of the first or second embodiment, wherein the discrete energy levels of the semiconductor quantum dots 8 are used, a group III-V compound semiconductor of InAs is used as the quantum dot material, and the semiconductor quantum dots are in the range of 3 nm to 9 nm in radius. Here, the semiconductor quantum dots having the same size are used in the optical waveguide 4. With this arrangement, an optical waveguide system having an emission wavelength of 528 nm to 2167 nm is obtained. Accordingly, it is possible to achieve the wavelength that can cause resonance of the single-metal nanoparticles 6 and cause the smallest loss in the optical waveguide 4 having the metal nanoparticles 6 dispersed therein. Thus, in the optical waveguide 4 having the metal nanoparticles 6 dispersed therein, near-field light can be guided in a chain-reaction manner by causing surface plasmon resonance of the single-metal nanoparticles 6 adjacent to the semiconductor quantum dots 8, and an electromagnetic field of the wavelength that causes the smallest loss in the optical waveguide 4 having the metal nanoparticles 6 dispersed therein can be guided.

As in Example 3, surface plasmon resonance of the single-metal nanoparticles 6 cannot be caused with light of a shorter wavelength than 400 nm in this example. However, the wavelength of the surface plasmon resonance can be between 400 nm and 600 nm by changing the material of the single-metal nanoparticles 6, or the material, sizes or shapes of the neighboring dielectric material. In this case, surface plasmon resonance of the single-metal nanoparticles can be caused with use of the semiconductor quantum dots 8 that can emit light at the wavelength. With light of a longer wavelength than 5330 nm, large loss is caused in the optical waveguide 4 having the metal nanoparticles 6 dispersed therein. However, by changing the material of the metal nanoparticles 6 in the optical waveguide 4, or the material, sizes or spacing of the neighboring dielectric material, the wavelength that causes the smallest loss in the optical waveguide can be between 400 nm and 5330 nm. In this case, an electromagnetic field of the wavelength causing the smallest loss can be guided with use of the semiconductor quantum dots 8 that can emit light at the wavelength.

Comparative Example

In a comparative example of Example 8, InAs semiconductor quantum dots, each of which has a radius greater than 9 nm, are used as the semiconductor quantum dots 8 in the optical waveguide system of Example 8. In the optical waveguide system of the comparative example, the discrete quantum level spacing of the semiconductor quantum dots becomes smaller than 4.14 meV, which is the heat fluctuation (kT) at room temperature (300 K). Therefore, the discrete quantum levels of the semiconductor quantum dots do not function as discrete levels, and the desired light emission cannot be achieved.

Example 9

Next, an optical waveguide system in accordance with Example 9 of the present invention is described. The optical waveguide system of the example is the optical waveguide system of the first or second embodiment, wherein the discrete energy levels of the semiconductor quantum dots 8 are used, a group III-V compound semiconductor of GaP is used as the quantum dot material, and the semiconductor quantum dots are in the range of 1 nm to 6 nm in radius. Here, the semiconductor quantum dots having the same size are used in the optical waveguide 4. With this arrangement, an optical waveguide system having an emission wavelength of 426 nm to 542 nm is obtained. Accordingly, it is possible to achieve the wavelength that can cause resonance of the single-metal nanoparticles 6 and cause the smallest loss in the optical waveguide 4 having the metal nanoparticles 6 dispersed therein. Thus, in the optical waveguide 4 having the metal nanoparticles 6 dispersed therein, near-field light can be guided in a chain-reaction manner by causing surface plasmon resonance of the single-metal nanoparticles 6 adjacent to the semiconductor quantum dots 8, and an electromagnetic field of the wavelength that causes the smallest loss in the optical waveguide 4 having the metal nanoparticles 6 dispersed therein can be guided.

As in Example 3, surface plasmon resonance of the single-metal nanoparticles 6 cannot be caused with light of a shorter wavelength than 400 nm in this example. However, the wavelength of the surface plasmon resonance can be between 400 nm and 600 nm by changing the material of the single-metal nanoparticles 6, or the material, sizes or shapes of the neighboring dielectric material. In this case, surface plasmon resonance of the single-metal nanoparticles can be caused with use of the semiconductor quantum dots 8 that can emit light at the wavelength. With light of a longer wavelength than 5330 nm, large loss is caused in the optical waveguide 4 having the metal nanoparticles 6 dispersed therein. However, by changing the material of the metal nanoparticles 6 in the optical waveguide 4, or the material, sizes or spacing of the neighboring dielectric material, the wavelength that causes the smallest loss in the optical waveguide can be between 400 nm and 5330 nm. In this case, an electromagnetic field of the wavelength causing the smallest loss can be guided with use of the semiconductor quantum dots 8 that can emit light at the wavelength.

Comparative Example

In a comparative example of Example 9, GaP semiconductor quantum dots, each of which has a radius greater than 6 nm, are used as the semiconductor quantum dots 8 in the optical waveguide system of Example 9. In the optical waveguide system of the comparative example, the discrete quantum level spacing of the semiconductor quantum dots becomes smaller than 4.14 meV, which is the heat fluctuation (kT) at room temperature (300 K). Therefore, the discrete quantum levels of the semiconductor quantum dots do not function as discrete levels, and the desired light emission cannot be achieved.

Example 10

Next, an optical waveguide system in accordance with Example 10 of the present invention is described. The optical waveguide system of the example is the optical waveguide system of the first or second embodiment, wherein the discrete energy levels of the semiconductor quantum dots 8 are used, a group III-V compound semiconductor of InP is used as the quantum dot material, and the semiconductor quantum dots are in the range of 2 nm to 13 nm in radius. With this arrangement, an optical waveguide system having an emission wavelength of 456 nm to 903 nm is obtained. Accordingly, it is possible to achieve the wavelength that can cause resonance of the single-metal nanoparticles 6 and cause the smallest loss in the optical waveguide 4 having the metal nanoparticles 6 dispersed therein. Thus, in the optical waveguide 4 having the metal nanoparticles 6 dispersed therein, near-field light can be guided in a chain-reaction manner by causing surface plasmon resonance of the single-metal nanoparticles 6 adjacent to the semiconductor quantum dots 8, and an electromagnetic field of the wavelength that causes the smallest loss in the optical waveguide 4 having the metal nanoparticles 6 dispersed therein can be guided.

As in Example 3, surface plasmon resonance of the single-metal nanoparticles 6 cannot be caused with light of a shorter wavelength than 400 nm in this example. However, the wavelength of the surface plasmon resonance can be between 400 nm and 600 nm by changing the material of the single-metal nanoparticles 6, or the material, sizes or shapes of the neighboring dielectric material. In this case, surface plasmon resonance of the single-metal nanoparticles can be caused with use of the semiconductor quantum dots 8 that can emit light at the wavelength. With light of a longer wavelength than 5330 nm, large loss is caused in the optical waveguide 4 having the metal nanoparticles 6 dispersed therein. However, by changing the material of the metal nanoparticles 6 in the optical waveguide 4, or the material, sizes or spacing of the neighboring dielectric material, the wavelength that causes the smallest loss in the optical waveguide can be between 400 nm and 5330 nm. In this case, an electromagnetic field of the wavelength causing the smallest loss can be guided with use of the semiconductor quantum dots 8 that can emit light at the wavelength.

Comparative Example

In a comparative example of Example 10, InP semiconductor quantum dots, each of which has a radius greater than 13 nm, are used as the semiconductor quantum dots 8 in the optical waveguide system of Example 10. In the optical waveguide system of the comparative example, the discrete quantum level spacing of the semiconductor quantum dots becomes smaller than 4.14 meV, which is the heat fluctuation (kT) at room temperature (300 K). Therefore, the discrete quantum levels of the semiconductor quantum dots do not function as discrete levels, and the desired light emission cannot be achieved.

Example 11

Next, an optical waveguide system in accordance with Example 11 of the present invention is described. The optical waveguide system of the example is the optical waveguide system of the first or second embodiment, wherein the discrete energy levels of the semiconductor quantum dots 8 are used, a group III-V compound semiconductor of GaSb is used as the quantum dot material, and the semiconductor quantum dots are in the range of 3 nm to 16 nm in radius. With this arrangement, an optical waveguide system having an emission wavelength of 638 nm to 1566 nm is obtained. Accordingly, it is possible to achieve the wavelength that can cause resonance of the single-metal nanoparticles 6 and cause the smallest loss in the optical waveguide 4 having the metal nanoparticles 6 dispersed therein. Thus, in the optical waveguide 4 having the metal nanoparticles 6 dispersed therein, near-field light can be guided in a chain-reaction manner by causing surface plasmon resonance of the single-metal nanoparticles 6 adjacent to the semiconductor quantum dots 8, and an electromagnetic field of the wavelength that causes the smallest loss in the optical waveguide 4 having the metal nanoparticles 6 dispersed therein can be guided.

As in Example 3, surface plasmon resonance of the single-metal nanoparticles 6 cannot be caused with light of a shorter wavelength than 400 nm in this example. However, the wavelength of the surface plasmon resonance can be between 400 nm and 600 nm by changing the material of the single-metal nanoparticles 6, or the material, sizes or shapes of the neighboring dielectric material. In this case, surface plasmon resonance of the single-metal nanoparticles can be caused with use of the semiconductor quantum dots 8 that can emit light at the wavelength. With light of a longer wavelength than 5330 nm, large loss is caused in the optical waveguide 4 having the metal nanoparticles 6 dispersed therein. However, by changing the material of the metal nanoparticles 6 in the optical waveguide 4, or the material, sizes or spacing of the neighboring dielectric material, the wavelength that causes the smallest loss in the optical waveguide can be between 400 nm and 5330 nm. In this case, an electromagnetic field of the wavelength causing the smallest loss can be guided with use of the semiconductor quantum dots 8 that can emit light at the wavelength.

Comparative Example

In a comparative example of Example 11, GaSb semiconductor quantum dots, each of which has a radius greater than 16 nm, are used as the semiconductor quantum dots 8 in the optical waveguide system of Example 11. In the optical waveguide system of the comparative example, the discrete quantum level spacing of the semiconductor quantum dots becomes smaller than 4.14 meV, which is the heat fluctuation (kT) at room temperature (300 K). Therefore, the discrete quantum levels of the semiconductor quantum dots do not function as discrete levels, and the desired light emission cannot be achieved.

Example 12

Next, an optical waveguide system in accordance with Example 12 of the present invention is described. The optical waveguide system of the example is the optical waveguide system of the first or second embodiment, wherein the discrete energy levels of the semiconductor quantum dots 8 are used, a group III-V compound semiconductor of AlSb is used as the quantum dot material, and the semiconductor quantum dots are in the range of 1 nm to 8 nm in radius. With this arrangement, an optical waveguide system having an emission wavelength of 422 nm to 756 nm is obtained. Accordingly, it is possible to achieve the wavelength that can cause resonance of the single-metal nanoparticles 6 and cause the smallest loss in the optical waveguide 4 having the metal nanoparticles 6 dispersed therein. Thus, in the optical waveguide 4 having the metal nanoparticles 6 dispersed therein, near-field light can be guided in a chain-reaction manner by causing surface plasmon resonance of the single-metal nanoparticles 6 adjacent to the semiconductor quantum dots 8, and an electromagnetic field of the wavelength that causes the smallest loss in the optical waveguide 4 having the metal nanoparticles 6 dispersed therein can be guided.

As in Example 3, surface plasmon resonance of the single-metal nanoparticles 6 cannot be caused with light of a shorter wavelength than 400 nm in this example. However, the wavelength of the surface plasmon resonance can be between 400 nm and 600 nm by changing the material of the single-metal nanoparticles 6, or the material, sizes or shapes of the neighboring dielectric material. In this case, surface plasmon resonance of the single-metal nanoparticles can be caused with use of the semiconductor quantum dots 8 that can emit light at the wavelength. With light of a longer wavelength than 5330 nm, large loss is caused in the optical waveguide 4 having the metal nanoparticles 6 dispersed therein. However, by changing the material of the metal nanoparticles 6 in the optical waveguide 4, or the material, sizes or spacing of the neighboring dielectric material, the wavelength that causes the smallest loss in the optical waveguide can be between 400 nm and 5330 nm. In this case, an electromagnetic field of the wavelength causing the smallest loss can be guided with use of the semiconductor quantum dots 8 that can emit light at the wavelength.

Comparative Example

In a comparative example of Example 12, AlSb semiconductor quantum dots, each of which has a radius greater than 8 nm, are used as the semiconductor quantum dots 8 in the optical waveguide system of Example 12. In the optical waveguide system of the comparative example, the discrete quantum level spacing of the semiconductor quantum dots becomes smaller than 4.14 meV, which is the heat fluctuation (kT) at room temperature (300 K). Therefore, the discrete quantum levels of the semiconductor quantum dots do not function as discrete levels, and the desired light emission cannot be achieved.

Example 13

Next, an optical waveguide system in accordance with Example 13 of the present invention is described. The optical waveguide system of the example is the optical waveguide system of the first or second embodiment, wherein the discrete energy levels of the semiconductor quantum dots 8 are used, a group III-V compound semiconductor of InSb is used as the quantum dot material, and the semiconductor quantum dots are in the range of 4 nm to 23 nm in radius. With this arrangement, an optical waveguide system having an emission wavelength of 647 nm to 5332 nm is obtained. Accordingly, it is possible to achieve the wavelength that can cause resonance of the single-metal nanoparticles 6 and cause the smallest loss in the optical waveguide 4 having the metal nanoparticles 6 dispersed therein. Thus, in the optical waveguide 4 having the metal nanoparticles 6 dispersed therein, near-field light can be guided in a chain-reaction manner by causing surface plasmon resonance of the single-metal nanoparticles 6 adjacent to the semiconductor quantum dots 8, and an electromagnetic field of the wavelength that causes the smallest loss in the optical waveguide having the metal nanoparticles 6 dispersed therein can be guided.

As in Example 3, surface plasmon resonance of the single-metal nanoparticles 6 cannot be caused with light of a shorter wavelength than 400 nm in this example. However, the wavelength of the surface plasmon resonance can be between 400 nm and 600 nm by changing the material of the single-metal nanoparticles 6, or the material, sizes or shapes of the neighboring dielectric material. In this case, surface plasmon resonance of the single-metal nanoparticles can be caused with use of the semiconductor quantum dots 8 that can emit light at the wavelength. With light of a longer wavelength than 5330 nm, large loss is caused in the optical waveguide 4 having the metal nanoparticles 6 dispersed therein. However, by changing the material of the metal nanoparticles 6 in the optical waveguide 4, or the material, sizes or spacing of the neighboring dielectric material, the wavelength that causes the smallest loss in the optical waveguide can be between 400 nm and 5330 nm. In this case, an electromagnetic field of the wavelength causing the smallest loss can be guided with use of the semiconductor quantum dots 8 that can emit light at the wavelength.

Comparative Example

In a comparative example of Example 13, InSb semiconductor quantum dots, each of which has a radius greater than 23 nm, are used as the semiconductor quantum dots 8 in the optical waveguide system of Example 13. In the optical waveguide system of the comparative example, the discrete quantum level spacing of the semiconductor quantum dots becomes smaller than 4.14 meV, which is the heat fluctuation (kT) at room temperature (300 K). Therefore, the discrete quantum levels of the semiconductor quantum dots do not function as discrete levels, and the desired light emission cannot be achieved.

Example 14

Next, an optical waveguide system in accordance with Example 14 of the present invention is described. The optical waveguide system of the example is the optical waveguide system of the first or second embodiment, wherein the discrete energy levels of the semiconductor quantum dots 8 are used, a group II-VI compound semiconductor of CdSe is used as the quantum dot material, and the semiconductor quantum dots are in the range of 2 nm to 11 nm in radius. With this arrangement, an optical waveguide system having an emission wavelength of 464 nm to 700 nm is obtained. Accordingly, it is possible to achieve the wavelength that can cause resonance of the single-metal nanoparticles 6 and cause the smallest loss in the optical waveguide 4 having the metal nanoparticles 6 dispersed therein. Thus, in the optical waveguide 4 having the metal nanoparticles 6 dispersed therein, near-field light can be guided in a chain-reaction manner by causing surface plasmon resonance of the single-metal nanoparticles 6 adjacent to the semiconductor quantum dots 8, and an electromagnetic field of the wavelength that causes the smallest loss in the optical waveguide 4 having the metal nanoparticles 6 dispersed therein can be guided.

As in Example 3, surface plasmon resonance of the single-metal nanoparticles 6 cannot be caused with light of a shorter wavelength than 400 nm in this example. However, the wavelength of the surface plasmon resonance can be between 400 nm and 600 nm by changing the material of the single-metal nanoparticles 6, or the material, sizes or shapes of the neighboring dielectric material. In this case, surface plasmon resonance of the single-metal nanoparticles can be caused with use of the semiconductor quantum dots 8 that can emit light at the wavelength. With light of a longer wavelength than 5330 nm, large loss is caused in the optical waveguide 4 having the metal nanoparticles 6 dispersed therein. However, by changing the material of the metal nanoparticles 6 in the optical waveguide 4, or the material, sizes or spacing of the neighboring dielectric material, the wavelength that causes the smallest loss in the optical waveguide can be between 400 nm and 5330 nm. In this case, an electromagnetic field of the wavelength causing the smallest loss can be guided with use of the semiconductor quantum dots 8 that can emit light at the wavelength.

Comparative Example

In a comparative example of Example 14, CdSe semiconductor quantum dots, each of which has a radius greater than 11 nm, are used as the semiconductor quantum dots 8 in the optical waveguide system of Example 14. In the optical waveguide system of the comparative example, the discrete quantum level spacing of the semiconductor quantum dots becomes smaller than 4.14 meV, which is the heat fluctuation (kT) at room temperature (300 K). Therefore, the discrete quantum levels of the semiconductor quantum dots do not function as discrete levels, and the desired light emission cannot be achieved.

Example 15

Next, an optical waveguide system in accordance with Example 15 of the present invention is described. The optical waveguide system of the example is the optical waveguide system of the first or second embodiment, wherein the discrete energy levels of the semiconductor quantum dots 8 are used, a group II-VI compound semiconductor of CdS is used as the quantum dot material, and the semiconductor quantum dots are in the range of 3 nm to 9 nm in radius. With this arrangement, an optical waveguide system having an emission wavelength of 436 nm to 475 nm is obtained. Accordingly, it is possible to achieve the wavelength that can cause resonance of the single-metal nanoparticles 6 and cause the smallest loss in the optical waveguide 4 having the metal nanoparticles 6 dispersed therein. Thus, in the optical waveguide 4 having the metal nanoparticles 6 dispersed therein, near-field light can be guided in a chain-reaction manner by causing surface plasmon resonance of the single-metal nanoparticles 6 adjacent to the semiconductor quantum dots 8, and an electromagnetic field of the wavelength that causes the smallest loss in the optical waveguide 4 having the metal nanoparticles 6 dispersed therein can be guided.

As in Example 3, surface plasmon resonance of the single-metal nanoparticles 6 cannot be caused with light of a shorter wavelength than 400 nm in this example. However, the wavelength of the surface plasmon resonance can be between 400 nm and 600 nm by changing the material of the single-metal nanoparticles 6, or the material, sizes or shapes of the neighboring dielectric material. In this case, surface plasmon resonance of the single-metal nanoparticles can be caused with use of the semiconductor quantum dots 8 that can emit light at the wavelength. With light of a longer wavelength than 5330 nm, large loss is caused in the optical waveguide 4 having the metal nanoparticles 6 dispersed therein. However, by changing the material of the metal nanoparticles 6 in the optical waveguide 4, or the material, sizes or spacing of the neighboring dielectric material, the wavelength that causes the smallest loss in the optical waveguide can be between 400 nm and 5330 nm. In this case, an electromagnetic field of the wavelength causing the smallest loss can be guided with use of the semiconductor quantum dots 8 that can emit light at the wavelength.

Comparative Example

In a comparative example of Example 15, CdS semiconductor quantum dots, each of which has a radius greater than 9 nm, are used as the semiconductor quantum dots 8 in the optical waveguide system of Example 15. In the optical waveguide system of the comparative example, the discrete quantum level spacing of the semiconductor quantum dots becomes smaller than 4.14 meV, which is the heat fluctuation (kT) at room temperature (300 K). Therefore, the discrete quantum levels of the semiconductor quantum dots do not function as discrete levels, and the desired light emission cannot be achieved.

Example 16

Next, an optical waveguide system in accordance with Example 16 of the present invention is described. The optical waveguide system of the example is the optical waveguide system of the first or second embodiment, wherein the discrete energy levels of the semiconductor quantum dots 8 are used, a group III-V mixed crystal semiconductor of $Al_xGa_{1-x}As$ (the mixed crystal ratio x: $0 \leq x \leq 1$) is used as the quantum dot material, and the semiconductor quantum dots are in the range of 2 nm to 14 nm in radius. With this arrangement, an optical waveguide system having an emission wavelength of 412 nm to 854 nm is obtained. Accordingly, it is possible to achieve the wavelength that can cause resonance of the single-metal nanoparticles 6 and cause the smallest loss in the optical waveguide 4 having the metal nanoparticles 6 dispersed therein. Thus, in the optical waveguide having the metal nanoparticles 6 dispersed therein, near-field light can be guided in a chain-reaction manner by causing surface plasmon resonance of the single-metal nanoparticles 6 adjacent to the semiconductor quantum dots 8, and an electromagnetic field of the wavelength that causes the smallest loss in the optical waveguide having the metal nanoparticles 6 dispersed therein can be guided.

As in Example 3, surface plasmon resonance of the single-metal nanoparticles 6 cannot be caused with light of a shorter wavelength than 400 nm in this example. However, the wavelength of the surface plasmon resonance can be between 400 nm and 600 nm by changing the material of the single-metal nanoparticles 6, or the material, sizes or shapes of the neighboring dielectric material. In this case, surface plasmon resonance of the single-metal nanoparticles can be caused with use of the semiconductor quantum dots 8 that can emit light at the wavelength. With light of a longer wavelength than 5330 nm, large loss is caused in the optical waveguide 4 having the metal nanoparticles 6 dispersed therein. However, by changing the material of the metal nanoparticles 6 in the optical waveguide 4, or the material, sizes or spacing of the neighboring dielectric material, the wavelength that causes the smallest loss in the optical waveguide can be between 400 nm and 5330 nm. In this case, an electromagnetic field of the wavelength causing the smallest loss can be guided with use of the semiconductor quantum dots 8 that can emit light at the wavelength.

Comparative Example

In a comparative example of Example 16, $Al_xGa_{1-x}As$ (the mixed crystal ratio x: $0 \leq x \leq 1$) semiconductor quantum dots, each of which has a radius greater than 14 nm, are used as the semiconductor quantum dots 8 in the optical waveguide system of Example 16. In the optical waveguide system of the comparative example, the discrete quantum level spacing of the semiconductor quantum dots becomes smaller than 4.14 meV, which is the heat fluctuation (kT) at room temperature (300 K). Therefore, the discrete quantum levels of the semiconductor quantum dots do not function as discrete levels, and the desired light emission cannot be achieved.

Example 17

Next, an optical waveguide system in accordance with Example 17 of the present invention is described. The optical waveguide system of the example is the optical waveguide system of the first or second embodiment, wherein the discrete energy levels of the semiconductor quantum dots 8 are used, a group III-V mixed crystal semiconductor of $GaAs_{1-x}Sb_x$ (the mixed crystal ratio x: $0 \leq x \leq 1$) is used as the quantum dot material, and the semiconductor quantum dots are in the range of 2 nm to 16 nm in radius. With this arrangement, an optical waveguide system having an emission wavelength of 412 nm to 1566 nm is obtained. Accordingly, it is possible to achieve the wavelength that can cause resonance of the single-metal nanoparticles 6 and cause the smallest loss in the optical waveguide 4 having the metal nanoparticles 6 dispersed therein. Thus, in the optical waveguide 4 having the metal nanoparticles 6 dispersed therein, near-field light can be guided in a chain-reaction manner by causing surface plasmon resonance of the single-metal nanoparticles 6 adjacent to the semiconductor quantum dots 8, and an electromagnetic field of the wavelength that causes the smallest loss in the optical waveguide 4 having the metal nanoparticles 6 dispersed therein can be guided.

As in Example 3, surface plasmon resonance of the single-metal nanoparticles 6 cannot be caused with light of a shorter wavelength than 400 nm in this example. However, the wavelength of the surface plasmon resonance can be between 400 nm and 600 nm by changing the material of the single-metal nanoparticles 6, or the material, sizes or shapes of the neighboring dielectric material. In this case, surface plasmon resonance of the single-metal nanoparticles can be caused with use of the semiconductor quantum dots 8 that can emit light at the wavelength. With light of a longer wavelength than 5330 nm, large loss is caused in the optical waveguide 4 having the metal nanoparticles 6 dispersed therein. However, by changing the material of the metal nanoparticles 6 in the optical waveguide 4, or the material, sizes or spacing of the neighboring dielectric material, the wavelength that causes the smallest loss in the optical waveguide can be between 400 nm and 5330 nm. In this case, an electromagnetic field of the wavelength causing the smallest loss can be guided with use of the semiconductor quantum dots 8 that can emit light at the wavelength.

Comparative Example

In a comparative example of Example 17, $GaAs_{1-x}Sb_x$ (the mixed crystal ratio x: $0 \leq x \leq 1$) semiconductor quantum dots, each of which has a radius greater than 16 nm, are used as the semiconductor quantum dots 8 in the optical waveguide system of Example 17. In the optical waveguide system of the comparative example, the discrete quantum level spacing of the semiconductor quantum dots becomes smaller than 4.14 meV, which is the heat fluctuation (kT) at room temperature (300 K). Therefore, the discrete quantum levels of the semiconductor quantum dots do not function as discrete levels, and the desired light emission cannot be achieved.

Example 18

Next, an optical waveguide system in accordance with Example 18 of the present invention is described. The optical waveguide system of the example is the optical waveguide system of the first or second embodiment, wherein the discrete energy levels of the semiconductor quantum dots 8 are used, a group III-V mixed crystal semiconductor of $In_{1-x}Ga_xP$ (the mixed crystal ratio x: $0 \leq x \leq 1$) is used as the quantum dot material, and the semiconductor quantum dots are in the range of 1 nm to 13 nm in radius. With this arrangement, an optical waveguide system having an emission wavelength of 426 nm to 903 nm is obtained. Accordingly, it is possible to achieve the wavelength that can cause resonance of the single-metal nanoparticles 6 and cause the smallest loss in the optical waveguide 4 having the metal nanoparticles 6 dispersed therein. Thus, in the optical waveguide 4 having the metal nanoparticles 6 dispersed therein, near-field light can be guided in a chain-reaction manner by causing surface plasmon resonance of the single-metal nanoparticles 6 adjacent to the semiconductor quantum dots 8, and an electromagnetic field of the wavelength that causes the smallest loss in the optical waveguide 4 having the metal nanoparticles 6 dispersed therein can be guided.

As in Example 3, surface plasmon resonance of the single-metal nanoparticles 6 cannot be caused with light of a shorter wavelength than 400 nm in this example. However, the wavelength of the surface plasmon resonance can be between 400 nm and 600 nm by changing the material of the single-metal nanoparticles 6, or the material, sizes or shapes of the neighboring dielectric material. In this case, surface plasmon resonance of the single-metal nanoparticles can be caused with use of the semiconductor quantum dots 8 that can emit light at the wavelength. With light of a longer wavelength than 5330 nm, large loss is caused in the optical waveguide 4 having the metal nanoparticles 6 dispersed therein. However, by changing the material of the metal nanoparticles 6 in the optical waveguide 4, or the material, sizes or spacing of the neighboring dielectric material, the wavelength that causes the smallest loss in the optical waveguide can be between 400 nm and 5330 nm. In this case, an electromagnetic field of the wavelength causing the smallest loss can be guided with use of the semiconductor quantum dots 8 that can emit light at the wavelength.

Comparative Example

In a comparative example of Example 18, $In_{1-x}Ga_xP$ (the mixed crystal ratio x: $0 \leq x \leq 1$) semiconductor quantum dots, each of which has a radius greater than 13, nm are used as the semiconductor quantum dots 8 in the optical waveguide system of Example 18. In the optical waveguide system of the comparative example, the discrete quantum level spacing of the semiconductor quantum dots becomes smaller than 4.14 meV, which is the heat fluctuation (kT) at room temperature (300 K). Therefore, the discrete quantum levels of the semiconductor quantum dots do not function as discrete levels, and the desired light emission cannot be achieved.

Example 19

Next, an optical waveguide system in accordance with Example 19 of the present invention is described. The optical waveguide system of the example is the optical waveguide system of the first or second embodiment, wherein the discrete energy levels of the semiconductor quantum dots 8 are used, a group III-V mixed crystal semiconductor of $In_{1-x}Ga_xAs$ (the mixed crystal ratio x: $0 \leq x \leq 1$) is used as the quantum dot material, and the semiconductor quantum dots are in the range of 2 nm to 9 nm in radius. With this arrangement, an optical waveguide system having an emission wavelength of 412 nm to 2167 nm is obtained. Accordingly, it is possible to achieve the wavelength that can cause resonance of the single-metal nanoparticles 6 and cause the smallest loss in the optical waveguide 4 having the metal nanoparticles 6 dispersed therein. Thus, in the optical waveguide 4 having the metal nanoparticles 6 dispersed therein, near-field light can be guided in a chain-reaction manner by causing surface plasmon resonance of the single-metal nanoparticles 6 adjacent to the semiconductor quantum dots 8, and an electromagnetic field of the wavelength that causes the smallest loss in the optical waveguide 4 having the metal nanoparticles 6 dispersed therein can be guided.

As in Example 3, surface plasmon resonance of the single-metal nanoparticles 6 cannot be caused with light of a shorter wavelength than 400 nm in this example. However, the wavelength of the surface plasmon resonance can be between 400 nm and 600 nm by changing the material of the single-metal nanoparticles 6, or the material, sizes or shapes of the neighboring dielectric material. In this case, surface plasmon resonance of the single-metal nanoparticles can be caused with use of the semiconductor quantum dots 8 that can emit light at the wavelength. With light of a longer wavelength than 5330 nm, large loss is caused in the optical waveguide 4 having the metal nanoparticles 6 dispersed therein. However, by changing the material of the metal nanoparticles 6 in the optical waveguide 4, or the material, sizes or spacing of the neighboring dielectric material, the wavelength that causes the smallest loss in the optical waveguide can be between 400 nm and 5330 nm. In this case, an electromagnetic field of the wavelength causing the smallest loss can be guided with use of the semiconductor quantum dots 8 that can emit light at the wavelength.

Comparative Example

In a comparative example of Example 19, $In_{1-x}Ga_xAs$ (the mixed crystal ratio x: $0 \leq x \leq 1$) semiconductor quantum dots, each of which has a radius greater than 9 nm, are used as the semiconductor quantum dots 8 in the optical waveguide system of Example 19. In the optical waveguide system of the comparative example, the discrete quantum level spacing of the semiconductor quantum dots becomes smaller than 4.14 meV, which is the heat fluctuation (kT) at room temperature (300 K). Therefore, the discrete quantum levels of the semiconductor quantum dots do not function as discrete levels, and the desired light emission cannot be achieved.

Example 20

Next, an optical waveguide system in accordance with Example 20 of the present invention is described. The optical waveguide system of the example is the optical waveguide system of the first or second embodiment, wherein the discrete energy levels of the semiconductor quantum dots 8 are used, a group II-VI compound semiconductor of ZnSe is used as the quantum dot material, and the semiconductor quantum dots are in the range of 3 nm to 10 nm in radius. With this arrangement, an optical waveguide system having an emission wavelength of 401 nm to 436 nm is obtained. Accordingly, it is possible to achieve the wavelength that can cause resonance of the single-metal nanoparticles 6 and cause the smallest loss in the optical waveguide 4 having the metal nanoparticles 6 dispersed therein. Thus, in the optical waveguide 4 having the metal nanoparticles 6 dispersed therein, near-field light can be guided in a chain-reaction manner by causing surface plasmon resonance of the single-metal nanoparticles 6 adjacent to the semiconductor quantum dots 8, and an electromagnetic field of the wavelength that causes the smallest loss in the optical waveguide 4 having the metal nanoparticles 6 dispersed therein can be guided.

As in Example 3, surface plasmon resonance of the single-metal nanoparticles 6 cannot be caused with light of a shorter wavelength than 400 nm in this example. However, the wavelength of the surface plasmon resonance can be between 400 nm and 600 nm by changing the material of the single-metal nanoparticles 6, or the material, sizes or shapes of the neighboring dielectric material. In this case, surface plasmon resonance of the single-metal nanoparticles can be caused with use of the semiconductor quantum dots 8 that can emit light at the wavelength. With light of a longer wavelength than 5330 nm, large loss is caused in the optical waveguide 4 having the metal nanoparticles 6 dispersed therein. However, by changing the material of the metal nanoparticles 6 in the optical waveguide 4, or the material, sizes or spacing of the neighboring dielectric material, the wavelength that causes the smallest loss in the optical waveguide can be between 400 nm and 5330 nm. In this case, an electromagnetic field of the wavelength causing the smallest loss can be guided with use of the semiconductor quantum dots 8 that can emit light at the wavelength.

Comparative Example

In a comparative example of Example 20, ZnSe semiconductor quantum dots, each of which has a radius greater than 10 nm, are used as the semiconductor quantum dots 8 in the optical waveguide system of Example 20. In the optical waveguide system of the comparative example, the discrete quantum level spacing of the semiconductor quantum dots becomes smaller than 4.14 meV, which is the heat fluctuation (kT) at room temperature (300 K). Therefore, the discrete quantum levels of the semiconductor quantum dots do not function as discrete levels, and the desired light emission cannot be achieved.

Example 21

Next, an optical waveguide system in accordance with Example 21 of the present invention is described. The optical waveguide system of the example is the optical waveguide system of the first or second embodiment, wherein the discrete energy levels of the semiconductor quantum dots 8 are used, a group II-VI compound semiconductor of ZnTe is used as the quantum dot material, and the semiconductor quantum dots are in the range of 3 nm to 11 nm in radius. With this arrangement, an optical waveguide system having an emission wavelength of 441 nm to 551 nm is obtained. Accordingly, it is possible to achieve the wavelength that can cause resonance of the single-metal nanoparticles 6 and cause the smallest loss in the optical waveguide 4 having the metal nanoparticles 6 dispersed therein. Thus, in the optical waveguide 4 having the metal nanoparticles 6 dispersed therein, near-field light can be guided in a chain-reaction manner by causing surface plasmon resonance of the single-metal nanoparticles 6 adjacent to the semiconductor quantum dots 8, and an electromagnetic field of the wavelength that causes the smallest loss in the optical waveguide 4 having the metal nanoparticles 6 dispersed therein can be guided.

As in Example 3, surface plasmon resonance of the single-metal nanoparticles 6 cannot be caused with light of a shorter wavelength than 400 nm in this example. However, the wavelength of the surface plasmon resonance can be between 400 nm and 600 nm by changing the material of the single-metal nanoparticles 6, or the material, sizes or shapes of the neighboring dielectric material. In this case, surface plasmon resonance of the single-metal nanoparticles can be caused with use of the semiconductor quantum dots 8 that can emit light at the wavelength. With light of a longer wavelength than 5330 nm, large loss is caused in the optical waveguide 4 having the metal nanoparticles 6 dispersed therein. However, by changing the material of the metal nanoparticles 6 in the optical waveguide 4, or the material, sizes or spacing of the neighboring dielectric material, the wavelength that causes the smallest loss in the optical waveguide can be between 400 nm and 5330 nm. In this case, an electromagnetic field of the wavelength causing the smallest loss can be guided with use of the semiconductor quantum dots 8 that can emit light at the wavelength.

Comparative Example

In a comparative example of Example 21, ZnTe semiconductor quantum dots, each of which has a radius greater than 11 nm, are used as the semiconductor quantum dots 8 in the optical waveguide system of Example 21. In the optical waveguide system of the comparative example, the discrete quantum level spacing of the semiconductor quantum dots becomes smaller than 4.14 meV, which is the heat fluctuation (kT) at room temperature (300 K). Therefore, the discrete quantum levels of the semiconductor quantum dots do not function as discrete levels, and the desired light emission cannot be achieved.

Example 22

Next, an optical waveguide system in accordance with Example 22 of the present invention is described. The optical waveguide system of the example is the optical waveguide system of the first or second embodiment, wherein the discrete energy levels of the semiconductor quantum dots 8 are used, a group III-V compound semiconductor of InN is used as the quantum dot material, and the semiconductor quantum dots are in the range of 2 nm to 11 nm in radius. With this arrangement, an optical waveguide system having an emission wavelength of 430 nm to 620 nm is obtained. Accordingly, it is possible to achieve the wavelength that can cause resonance of the single-metal nanoparticles 6 and cause the smallest loss in the optical waveguide 4 having the metal nanoparticles 6 dispersed therein. Thus, in the optical waveguide 4 having the metal nanoparticles 6 dispersed therein, near-field light can be guided in a chain-reaction manner by causing surface plasmon resonance of the single-metal nanoparticles 6 adjacent to the semiconductor quantum dots 8, and an electromagnetic field of the wavelength that causes the smallest loss in the optical waveguide 4 having the metal nanoparticles 6 dispersed therein can be guided.

As in Example 3, surface plasmon resonance of the single-metal nanoparticles 6 cannot be caused with light of a shorter wavelength than 400 nm in this example. However, the wavelength of the surface plasmon resonance can be between 400 nm and 600 nm by changing the material of the single-metal nanoparticles 6, or the material, sizes or shapes of the neighboring dielectric material. In this case, surface plasmon resonance of the single-metal nanoparticles can be caused with use of the semiconductor quantum dots 8 that can emit light at the wavelength. With light of a longer wavelength than 5330 nm, large loss is caused in the optical waveguide 4 having the metal nanoparticles 6 dispersed therein. However, by changing the material of the metal nanoparticles 6 in the optical waveguide 4, or the material, sizes or spacing of the neighboring dielectric material, to the wavelength that causes the smallest loss in the optical waveguide can be between 400 nm and 5330 nm. In this case, an electromagnetic field of the wavelength causing the smallest loss can be guided with use of the semiconductor quantum dots 8 that can emit light at the wavelength.

Comparative Example

In a comparative example of Example 22, InN semiconductor quantum dots, each of which has a radius greater than 11 nm, are used as the semiconductor quantum dots 8 in the optical waveguide system of Example 22. In the optical waveguide system of the comparative example, the discrete quantum level spacing of the semiconductor quantum dots becomes smaller than 4.14 meV, which is the heat fluctuation (kT) at room temperature (300 K). Therefore, the discrete quantum levels of the semiconductor quantum dots do not function as discrete levels, and the desired light emission cannot be achieved.

Example 23

Next, an optical waveguide system in accordance with Example 23 of the present invention is described. The optical waveguide system of the example is the optical waveguide system of the first or second embodiment, wherein the discrete energy levels of the semiconductor quantum dots 8 are used, a group III-V compound semiconductor of $In_xGa_{1-x}N$ (the mixed crystal ratio x: $0 \leq x \leq 1$) is used as the quantum dot material, and the semiconductor quantum dots are in the range of 2 nm to 11 nm in radius. With this arrangement, an optical waveguide system having an emission wavelength of 430 nm to 620 nm is obtained. Accordingly, it is possible to achieve the wavelength that can cause resonance of the single-metal nanoparticles 6 and cause the smallest loss in the optical waveguide 4 having the metal nanoparticles 6 dispersed therein. Thus, in the optical waveguide 4 having the metal nanoparticles 6 dispersed therein, near-field light can be guided in a chain-reaction manner by causing surface plasmon resonance of the single-metal nanoparticles 6 adjacent to the semiconductor quantum dots 8, and an electromagnetic field of the wavelength that causes the smallest loss in the optical waveguide 4 having the metal nanoparticles 6 dispersed therein can be guided.

As in Example 3, surface plasmon resonance of the single-metal nanoparticles 6 cannot be caused with light of a shorter wavelength than 400 nm in this example. However, the wavelength of the surface plasmon resonance can be between 400 nm and 600 nm by changing the material of the single-metal nanoparticles 6, or the material, sizes or shapes of the neighboring dielectric material. In this case, surface plasmon resonance of the single-metal nanoparticles can be caused with use of the semiconductor quantum dots 8 that can emit light at the wavelength. With light of a longer wavelength than 5330 nm, large loss is caused in the optical waveguide 4 having the metal nanoparticles 6 dispersed therein. However, by changing the material of the metal nanoparticles 6 in the optical waveguide 4, or the material, sizes or spacing of the neighboring dielectric material, to the wavelength that causes the smallest loss in the optical waveguide can be between 400 nm and 5330 nm. In this case, an electromagnetic field of the wavelength causing the smallest loss can be guided with use of the semiconductor quantum dots 8 that can emit light at the wavelength.

Comparative Example

In a comparative example of Example 23, $In_xGa_{1-x}N$ (the mixed crystal ratio x: $00 \leq x \leq 1$) semiconductor quantum dots, each of which has a radius greater than 11 nm, are used as the semiconductor quantum dots 8 in the optical waveguide system of Example 23. In the optical waveguide system of the comparative example, the discrete quantum level spacing of the semiconductor quantum dots becomes smaller than 4.14 meV, which is the heat fluctuation (kT) at room temperature (300 K). Therefore, the discrete quantum levels of the semiconductor quantum dots do not function as discrete levels, and the desired light emission cannot be achieved.

FIG. 9 is a table showing the material, the minimum radius (nm), the maximum radius (nm), the shortest emission wavelength (nm), and the longest emission wavelength (nm) of each of the semiconductor quantum dots used in Examples 4 through 23.

In Examples 1 through 23, the metal nanoparticles dispersed in the optical waveguide 4 are silver nanoparticles. However, the same effects as above can be achieved using gold nanoparticles.

Other than Ag and Au, Pb, Ti, Al, Cu, In, Ir, W, Cr, Ni, Fe, Co, Zn, Ge, Sn, Mn, Mo, Bi, or the like may be used for the metal nanoparticles dispersed in the optical waveguide include.

Next, the dispersion materials that can be used for dispersing the semiconductor quantum dots in the optical waveguide will be described. Examples of the dispersion materials determined by the dispersion process in $SiO_2$ matrix in the optical waveguide having metal nanoparticles dispersed therein include hexane, pyridine, methanol, and aromatic compounds (the specific compositions is performed using conventional technique such as that disclosed in Journal of the American Chemical Society, VOL. 115, p. 8706, and the like) in a case where the semiconductor quantum dots are covered with Tri-n-octylphosphine oxide/Tri-n-octylphosphine (TOPO/TOP).

Another example of the dispersion material may be poly (acrylonitrile-styrene) polymer or the like.

In a case where the quantum dots are covered with thiophenol, the dot dispersion material may be acetonitrile or the like (the specific composition is performed using a conventional technique such as that disclosed in Journal of Applied Physics, VOL. 73, p. 5237, and the like).

In a case where the quantum dots are covered with Tri-n-octylphosphine oxide, the dispersion material may be chloroform, toluene, PMMA/toluene, or the like (the specific composition is performed using a conventional technique such as that disclosed in Journal of Physical Chemistry B, VOL. 108, p. 143, Journal of Physical Chemistry B, VOL. 101, p. 9463, and the like).

In a case where the quantum dots are covered with S-phenyl group, the dispersion material may be water or the like (the specific composition is performed using a conventional technique such as that disclosed in Applied Physics A, VOL. 53, p. 465, and the like).

In a case where the quantum dots are covered with poly vinyl pyrrolidone—sodium selenosulfate, the dispersion material may be water, acetonitrile, or the like (the specific composition is performed using a conventional technique such as that disclosed in Materials Science and Engineering B, VOL. 52, p. 89, and the like).

In a case where the quantum dots are covered with poly (aminoamine) dendrimers, the dispersion material may be water, methanol, or the like (the specific composition is performed using a conventional technique such as that disclosed in Materials Science and Engineering B, VOL. 52, p. 89, and the like). With use of such dispersion materials, the semiconductor quantum dots can be dispersed in $SiO_2$ matrix in the optical waveguide 4.

As described hereinbefore, according to each of the embodiments and examples of the present invention, an optical waveguide system that has a coupling mechanism capable of selecting a wavelength and has the highest possible conversion efficiency, and that is capable of providing directivity in the light propagation direction.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concepts as defined by the appended claims and their equivalents.

What is claimed is:

1. An optical waveguide system comprising:
a three-dimensional photonic crystalline structure including crystal pillars and having a hollow structure inside thereof;
an optical waveguide in which a plurality of metal nanoparticles are dispersed in a dielectric material, the optical waveguide having an end portion inserted between the crystal pillars of the three-dimensional photonic crystalline structure, and containing semiconductor quantum dots that are located adjacent to the metal nanoparticles and emit near-field light when receiving excitation light, the metal nanoparticles exciting surface plasmon when receiving the near-field light; and
an excitation light source that emits the excitation light for exciting the semiconductor quantum dots.

2. The system according to claim 1, wherein the excitation light source is arranged in such a manner that the excitation light source can irradiate excitation light onto a side face of the end portion of the optical waveguide, the side face being substantially parallel to an extending direction of the optical waveguide.

3. The system according to claim 1, wherein the excitation light source is arranged in such a manner that the excitation light source can irradiate the excitation light onto an end face of the end portion of the optical waveguide, the end face being substantially perpendicular to an extending direction of the optical waveguide extends.

4. The system according to claim 1, wherein each of the semiconductor quantum dots have a diameter of 46 nm or smaller.

5. The system according to claim 1, wherein the semiconductor quantum dots are formed with a group IV semiconductor, a group III-V semiconductor, or a group II-VI semiconductor, and have an emission wavelength ranging from 400 nm at a minimum to 5330 nm at a maximum.

6. The system according to claim 1, wherein the semiconductor quantum dots existing in the optical waveguide have a density of $4 \times 10^{22}$ m$^{-3}$ or lower.

* * * * *